United States Patent
Katagiri

(10) Patent No.: US 11,354,897 B2
(45) Date of Patent: Jun. 7, 2022

(54) OUTPUT CONTROL APPARATUS FOR ESTIMATING RECOGNITION LEVEL FOR A PLURALITY OF TAGET OBJECTS, DISPLAY CONTROL SYSTEM, AND OUTPUT CONTROL METHOD FOR OPERATING OUTPUT CONTROL APPARATUS

(71) Applicant: Keita Katagiri, Kanagawa (JP)

(72) Inventor: Keita Katagiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/990,386

(22) Filed: Aug. 11, 2020

(65) Prior Publication Data

US 2021/0064876 A1    Mar. 4, 2021

(30) Foreign Application Priority Data

Aug. 27, 2019   (JP) .............................. JP2019-154518

(51) Int. Cl.
*G06V 20/20*    (2022.01)
*G06F 3/14*    (2006.01)
(Continued)

(52) U.S. Cl.
CPC ................ *G06V 20/20* (2022.01); *G06F 3/14* (2013.01); *G06T 11/00* (2013.01); *G06V 20/56* (2022.01); *G06V 40/10* (2022.01); *G05D 1/0094* (2013.01)

(58) Field of Classification Search
None
See application file for complete search history.

(56) References Cited

U.S. PATENT DOCUMENTS

2012/0038668 A1\*  2/2012  Kim ........................ G06F 3/011
                                                                     345/633
2014/0193074 A1\*  7/2014  Huang ................. G06K 9/4676
                                                                     382/180

(Continued)

FOREIGN PATENT DOCUMENTS

EP            2256667 A1    12/2010
JP          2007-035038       2/2007

(Continued)

OTHER PUBLICATIONS

L.Itti, C.Koch, and E.Niebur. "A model of saliency-based visual attention for rapid scene analysis," IEEE Transactions on Pattern Analysisand Machine Intelligence, vol. 20, No. 11, pp. 1254-1259, 1998.

(Continued)

*Primary Examiner* — Edward Martello
(74) *Attorney, Agent, or Firm* — Harness, Dickey & Pierce, P.L.C.

(57) ABSTRACT

An output control apparatus includes circuitry configured to acquire image data of a plurality of target objects captured at a site by an image capture device as captured image data; detect the plurality of target objects included in the captured image data; estimate a recognition level of an observing person on the detected plurality of target objects; identify a specific target object having lower recognition level among the detected plurality of target objects based on the estimated recognition level; and output screen-display image data including additional information set for the identified specific target object having lower recognition level, the screen-display image data generated for the acquired captured image data.

20 Claims, 13 Drawing Sheets

(51) Int. Cl.
  *G06T 11/00* (2006.01)
  *G06V 20/56* (2022.01)
  *G06V 40/10* (2022.01)
  *G05D 1/00* (2006.01)

(56) References Cited

U.S. PATENT DOCUMENTS

| 2017/0344858 | A1* | 11/2017 | Ohira | G06K 9/00771 |
| 2018/0246520 | A1* | 8/2018 | Martinson | G05D 1/0094 |
| 2019/0286912 | A1* | 9/2019 | Chan | G06K 9/6282 |

FOREIGN PATENT DOCUMENTS

| JP | 2011-008772 | 1/2011 |
| JP | 2012-243313 | 12/2012 |
| JP | 2017-028402 | 2/2017 |
| JP | 2020-112698 | 7/2020 |
| WO | WO2013/141997 A1 | 9/2013 |
| WO | WO2020/144974 A1 | 7/2020 |

OTHER PUBLICATIONS

J. Harel, C. Koch, and P. Perona, "Graph-based visual saliency," Advances in Neural Information Processing Systems, pp. 545-552, 2007.

Extended European Search Report dated Jan. 27, 2021 for corresponding European Application No. 20192109.5.

* cited by examiner

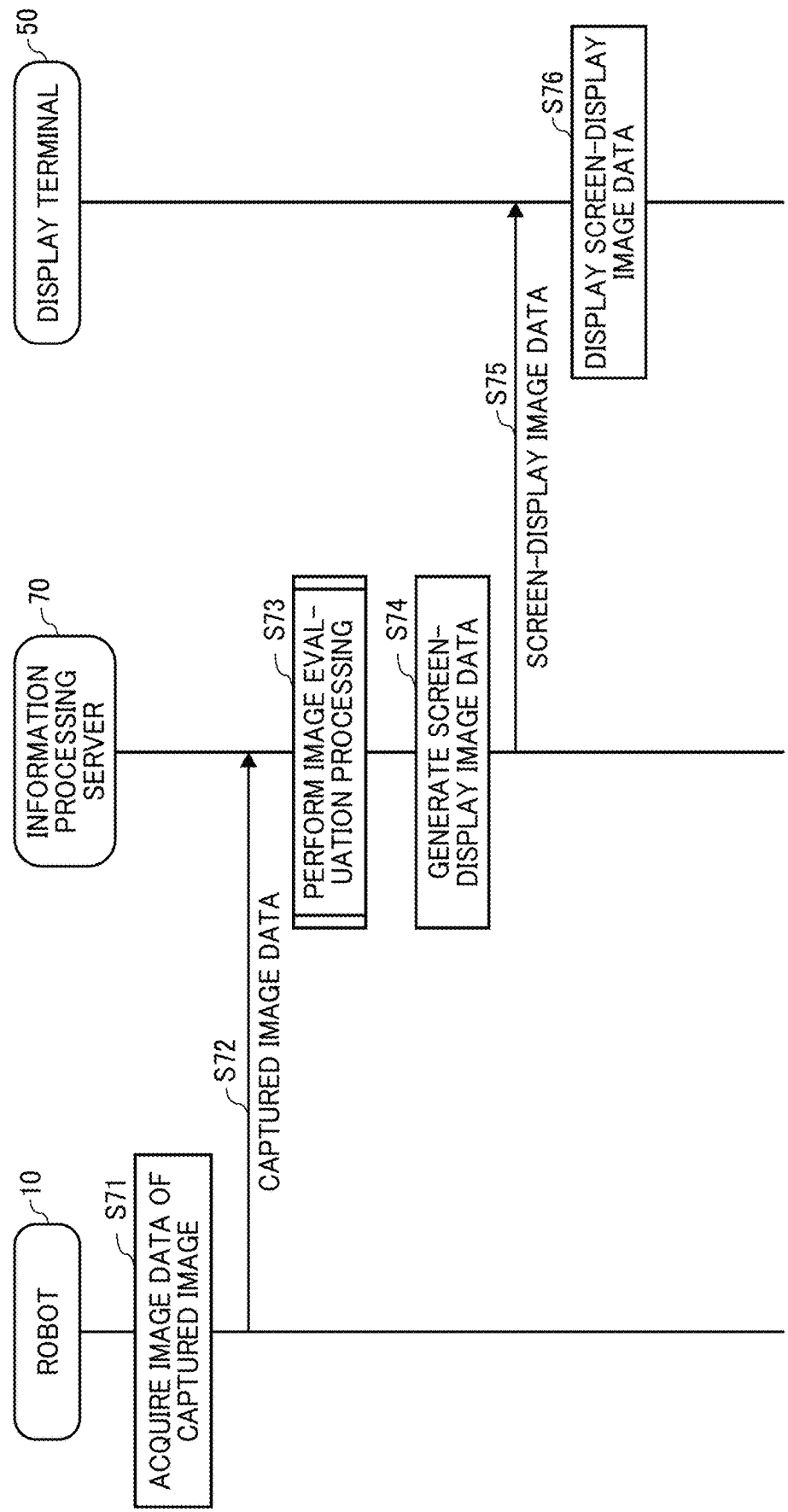

OUTPUT CONTROL APPARATUS FOR ESTIMATING RECOGNITION LEVEL FOR A PLURALITY OF TAGET OBJECTS, DISPLAY CONTROL SYSTEM, AND OUTPUT CONTROL METHOD FOR OPERATING OUTPUT CONTROL APPARATUS

CROSS-REFERENCE TO RELATED APPLICATION

This application claims priority pursuant to 35 U.S.C. § 119(a) to Japanese Patent Application No. 2019-154518, filed on Aug. 27, 2019 in the Japan Patent Office, the disclosure of which is incorporated by reference herein in its entirety.

BACKGROUND

Technical Field

This disclosure relates to an output control apparatus, a display control system, an output control method, and a storage medium.

Background Art

Remote control systems for controlling telepresence robots (hereinafter, robots) disposed at remote sites from display terminals disposed at another locations via communication networks are known. As to the remote control systems, images captured by image capture devices provided for the robots can be displayed on the display terminals, with which administrators can check information on the remote sites where the robots are disposed, from another locations.

Further, augmented reality (AR) navigation technology, which supports operation of an operator, is known, in which when the operator operates a movable apparatus, such as robot, computer graphics (CG) images are superimposed on an image captured by an image capture device provided for the movable apparatus. For example, a technology for assisting a driver of movable apparatus, such as vehicle, for unexpected events is disclosed.

SUMMARY

As one aspect of the present disclosure, an output control apparatus is devised. The output control apparatus includes circuitry configured to acquire image data of a plurality of target objects captured at a site by an image capture device as captured image data; detect the plurality of target objects included in the captured image data; estimate a recognition level of an observing person on the detected plurality of target objects; identify a specific target object having lower recognition level among the detected plurality of target objects based on the estimated recognition level; and output screen-display image data including additional information set for the identified specific target object having lower recognition level, the screen-display image data generated for the acquired captured image data.

As another aspect of the present disclosure, a display control system is devised. The display control system includes a control apparatus including an image capture device configured to capture images of a plurality of target objects by capturing images of things present at a site; a display terminal configured to communicate with the control apparatus; and circuitry configured to acquire image data of the plurality of target objects captured by the image capture device as captured image data; detect the plurality of target objects included in the captured image data; estimate a recognition level of an observing person on the detected plurality of target objects; identify a specific target object having lower recognition level among the detected plurality of target objects based on the estimated recognition level; and output, to the display terminal, screen-display image data including additional information set for the identified specific target object having lower recognition level, generated for the acquired captured image data, the screen-display image data is displayed as a screen-display image at the display terminal.

As another aspect of the present disclosure, a method of controlling of an output control apparatus is devised. The method includes acquiring image data of a plurality of target objects at a site captured by an image capture device as captured image data; detecting the plurality of target objects included in the captured image data; estimating a recognition level of an observing person on the detected plurality of target objects; identifying a specific target object having lower recognition level among the detected plurality of target objects based on the estimated recognition level; and outputting screen-display image data including additional information set for the identified specific target object having lower recognition level, the screen-display image data generated for the acquired captured image data.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 18 is an example of sequence diagram of display processing of site image in a display control system of modification example 2 according to an embodiment of this disclosure.

Figure 1:
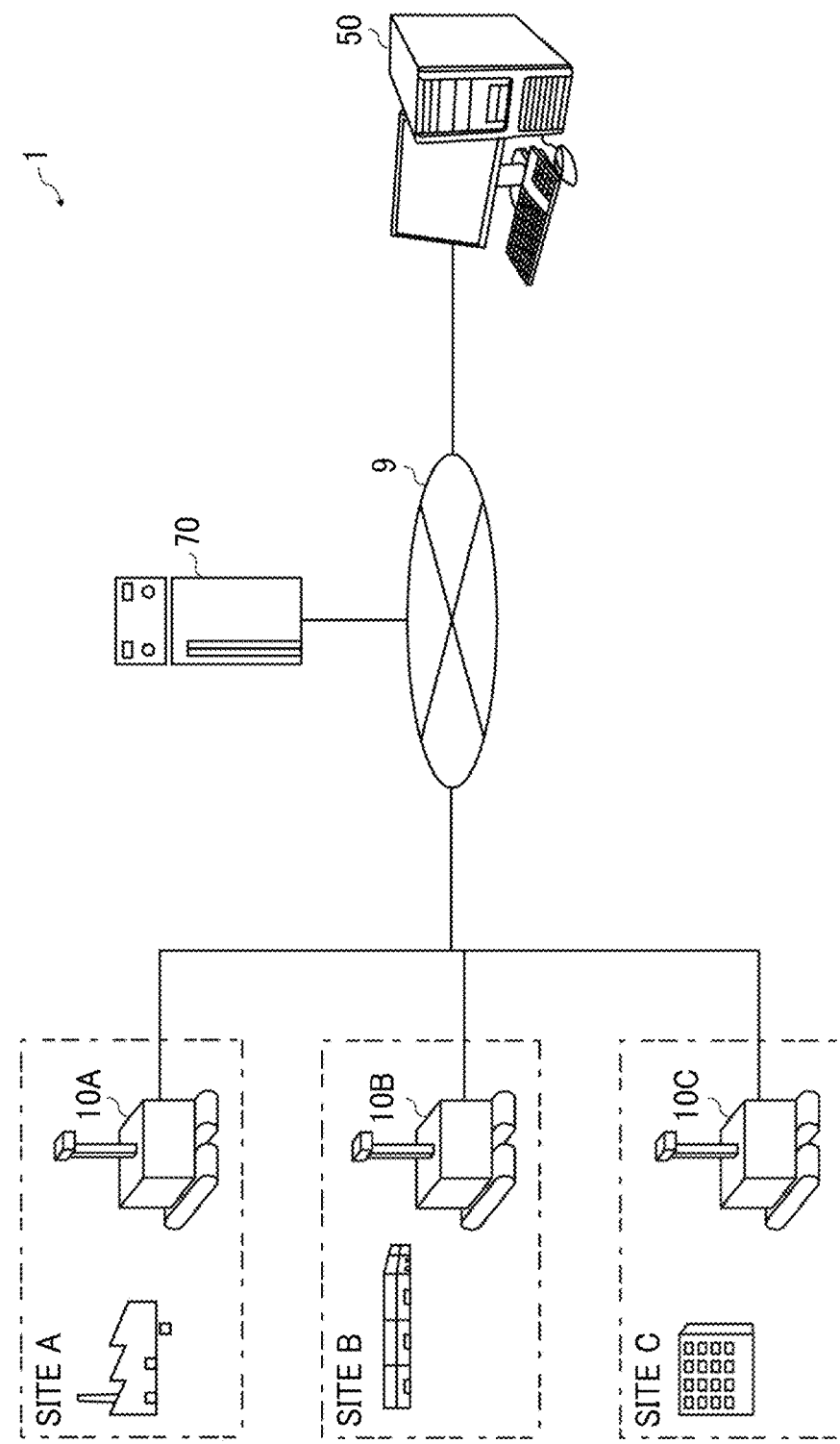
FIG. 1 is an example of system configuration of a display control system according to an embodiment of this disclosure.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of this disclosure with reference to the accompanying drawings. Further, the same elements are denoted by the same reference numerals in the description of the drawings, and the duplicate description is omitted.

(System Configuration)

FIG. 1 is an example of system configuration of a display control system 1 according to an embodiment. The display control system 1, illustrated in FIG. 1, is a system that performs a remote communication between a robot 10 disposed at each site, and an display terminal 50 used by an administrator at a remote location (e.g., control center) to perform control and maintenance works of apparatuses, devices, and equipment disposed at remote sites, and check positions and/or movement of persons present at the remote sites.

The display control system 1 can be configured with telepresence robots 10A, 10B, and 10C respectively disposed at a plurality of sites, such as site A, site B, and site C, a display terminal 50, and an information processing server 70. Hereinafter, each of the telepresence robots 10A, 10B, and 10C is simply referred to as the robot 10A, robot 10B, robot 10C, and the robots 10A, 10B, and 10C may be collectively referred to as the robot 10 when the distinguishing of the robots 10A, 10B, and 10C is not required. The telepresence robot can be configured with a robot system and an image capture-display system.

The robot 10, the display terminal 50, and the information processing server 70 are communicatively connected via a communication network 9. The communication network 9 is constructed by, for example, local area network (LAN), dedicated line, and the Internet. Further, the communication network 9 may not only have wired communication, but also wireless communication, such as Wi-Fi (registered trademark) or the like.

The robot 10, disposed at each site, such as site A, site B, and site C, is an example of moveable apparatus that autonomously moves or runs in each of the sites. The robot 10 moves at the site while capturing images of objects around the robot 10 using an image capture device 12, and transmits the images captured by the image capture device 12 to the display terminal 50 to provide information, such as images, in the site to the administrator who uses the display terminal 50.

The display terminal 50 is a terminal device, such as personal computer (PC), that performs remote control of each site using the robot 10 disposed at each site, such as site A, site B, and site C. The display terminal 50 displays the captured images transmitted from the robot 10. The administrator can perform the remote communication with a user (e.g., worker) at the site where the robot 10 is disposed while viewing the images displayed on the display terminal 50. Further, the administrator can perform remote operation of the robot 10 while viewing the images displayed on the display terminal 50.

The display terminal 50 may be provided with a display that can display the images transmitted from the robot 10, such as tablet terminal, portable telephone, smart phone, personal digital assistant (PDA), wearable terminal such as head-mountable display (HMD) used for wrist watch and sunglasses, head-up display (HUD), and communication terminal having a wide-angle screen (e.g., cylindrical screen, full-view spherical screen, semi-spherical screen).

The information processing server 70 is a server for controlling the operation of the robot 10 disposed at each site. The information processing server 70 is connected to the robot 10 and the display terminal 50 via the communication network 9. Further, the information processing server 70 may be configured as a single computer, or may be configured as a plurality of computers assigned with the functions divided from the total functions (function, means, or storage unit). The information processing server 70 is an example of server (information processing apparatus) in this disclosure.

The site where the robot 10 is disposed is, for example, office, school, warehouse, factory, construction site, or the like. The administrator, using the display terminal 50 to perform the remote control of each site, can check images of each site transmitted from the robot 10 to confirm positions and movement of persons, such as users, at each site, and to perform management and maintenance of the equipment, devices, and apparatuses disposed in each site. Further, the robot 10 and the display terminal 50 can transmit and receive images captured by the robot 10 and the display terminal 50 to perform bidirectional communication, such as remote conferences.

Further, the display terminal 50 can be configured to communicate with the robots 10 disposed at a plurality of sites, or to communicate with the robots 10 disposed at a single site.

(Configuration of Robot)

Figure 2:
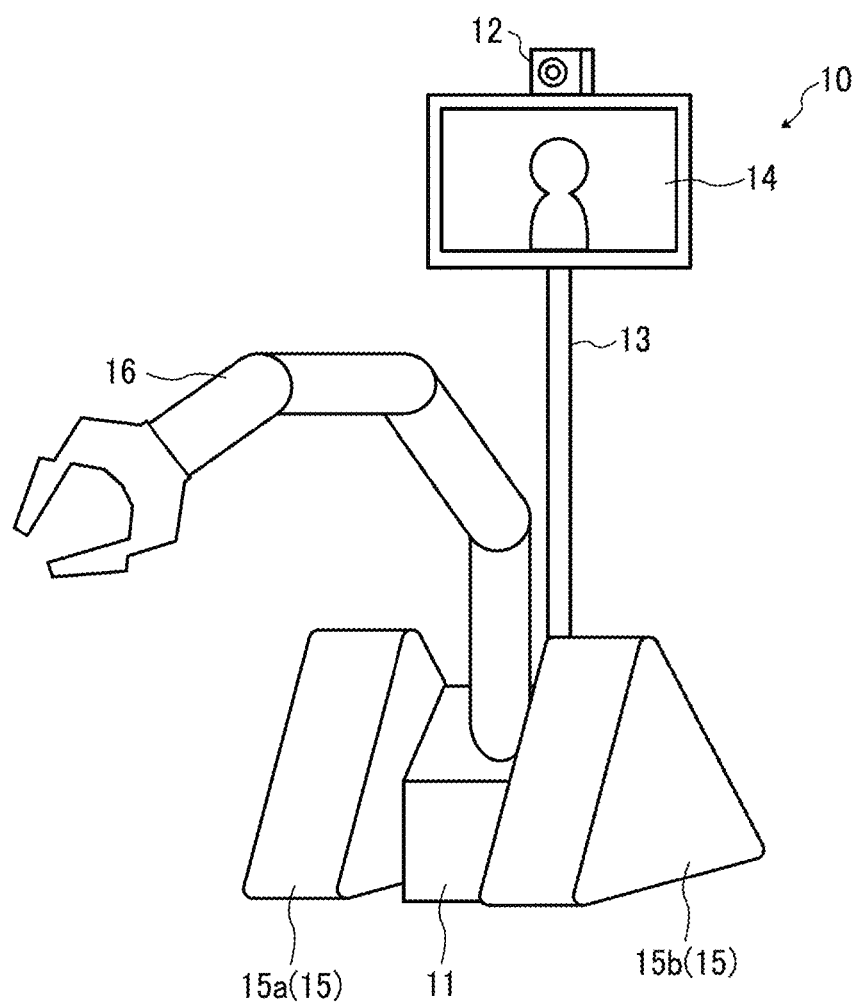
FIG. 2 is an example of schematic configuration of a robot according to an embodiment of this disclosure.

Hereinafter, a description is given of a configuration of the robot 10 according to the embodiment with reference to FIG. 2. FIG. 2 is an example of schematic configuration of the robot 10.

As illustrated in FIG. 2, the robot 10 includes, for example, a housing 11 including a control apparatus 30, an image capture device 12, a support member 13, a display 14, a movement mechanism 15 (15a, 15b) used for moving or traveling the robot 10, and a manipulation arm 16 used for performing a given work (operation) using the robot 10.

The housing 11, used as a body of the robot 10, includes, for example, a power supply unit that supplies power necessary for the robot 10, and the control apparatus 30 that controls processing or operation of the robot 10.

The image capture device 12 captures images of objects, such as persons, physical objects, and scenery, existing at the site where the robot 10 is disposed, and acquires the captured images. Hereinafter, the image of object captured by the image capture device 12 may be referred to as the captured image. The image capture device 12 is, for example, digital camera (general image capture device) that can acquire planar images (detailed images), such as digital single-lens reflex camera, and compact digital camera. The image data of the captured image acquired by the image capture device 12 is transmitted to the display terminal 50 via a communication session established by the information processing server 70, to be described later. The image capture device 12 is an example of image capture unit or means. Further, the captured image acquired by the image capture device 12 may be movie image, still image, or both of movie image and still image. Further, the captured image acquired by the image capture device 12 may include audio data together with the image data. Further, the captured image acquired by the image capture device 12 is not limited to color image, but may be luminance image using grayscale or the like.

Further, the image capture device 12 may be a wide-angle image capture device capable that can obtain panoramic image of full-view range such as 360-degree image. The wide-angle image capture device is, for example, a full-view spherical image capture device that can obtain two hemispherical images used for generating full-view spherical image (panorama image) by capturing images of an object. Further, the wide-angle image capture device may be, for example, a wide-angle camera or stereo camera that cam obtain wide-angle image having an angle of view larger than a given value. That is, the wide-angle image capture device is an imaging unit capable of obtaining or acquiring images (full-view spherical image, wide-angle image) by capturing images using a lens having a focal length shorter than a given value.

Further, the robot 10 may be configured with a plurality of image capture devices 12. In this case, the robot 10 may include a set of the wide-angle image capture device and the general image capture device as the image capture device 12, in which when the wide-angle image capture device captures the wide-angle image, the general image capture device captures a portion of object captured by the wide-angle image capture device to acquire a detailed image (planar image) of the portion of object.

Further, for example, the image capture device 12 may be an image capture device, such as stereo camera, that can obtain or acquire disparity images having depth information (distance information) indicating a depth of object.

Further, the robot 10 may also include a range detection apparatus, such as light detection and ranging (LIDAR) that can obtain or acquire depth information (distance information) indicating a depth of object with the image capture device 12.

The display 14 is a display unit for displaying various screens. The display 14 displays, for example, an image of administrator existing at a remote location.

Further, the display 14 may be provided separately from the robot 10 in a site where the robot 10 is disposed. In this case, the display 14 may be provided on a wearable terminal, such as PC, tablet terminal, portable phone, smart phone, PDA, or a head-mounted display.

Further, the display 14 may not be limited to a flat panel display (FPD), but may be a wide-angle screen (e.g., cylindrical screen, full-view spherical screen, semi-spherical screen).

The support member 13 is a member for setting or fixing the image capture device 12 on the robot 10, such as the housing 11. The support member 13 may be a pole fixed to the housing 11, or a base fixed to the housing 11. Further, the support member 13 may be a movable member that can adjust an image capture direction or orientation and position or height of the image capture device 12.

The movement mechanism 15 is a unit for moving or traveling the robot 10, and is composed of a wheel, a driving motor, a traveling encoder, a steering motor, a steering encoder, or the like. Since the movement control of the robot 10 is an existing technology, the detailed description is omitted. For example, when the robot 10 receives an travel request instruction from an operator, such as an administrator of the display terminal 50, the movement mechanism 15 moves the robot 10 based on the received travel request instruction.

Further, the movement mechanism 15 may be a foot type of two-foot walking, or a single wheel. Further, the shape of the robot 10 is not limited to a vehicle type illustrated in FIG. 2, but can be, for example, a human-type two-foot walking, a form of imitating organism, and a form of copying a specific character.

The manipulation arm 16 has an operation unit that can perform one or more operations, other than the movement of the robot 10. For example, as illustrated in FIG. 2, the manipulation arm 16 has a hand at an one end of the manipulation arm 16 as operation unit that can grip an object. The robot 10 can perform one or more works or operations by rotating or transforming the manipulation arm 16. The manipulation arm 16 may be also referred to as the movable arm.

Further, in addition to or other than the above configuration, the robot 10 may have various sensors capable of detecting information around the robot 10. The various sensors include sensor devices, such as barometer, thermometer, photometer, human sensor, or illuminance meter.

(Hardware Configuration of Display Control System)

Hereinafter, a description is given of a hardware configuration of each device or terminal configuring the display control system 1 with reference to FIGS. 3 to 5. Further, one or more elements of the hardware configuration illustrated in FIGS. 3 to 5 may be added or removed as needed.

(Hardware Configuration of Robot)

Figure 3:
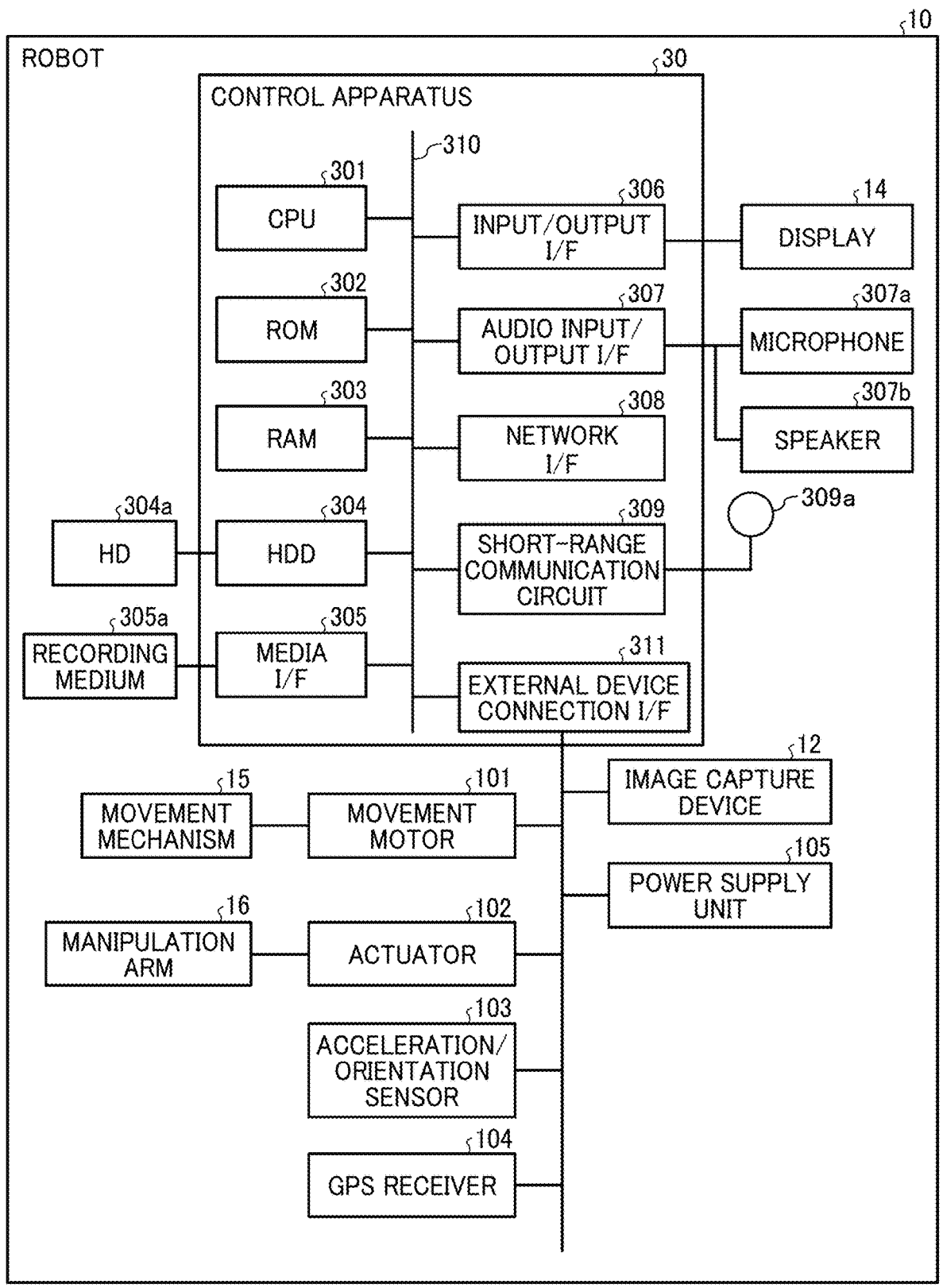
FIG. 3 is an example of configuration of hardware block diagram of a robot according to an embodiment of this disclosure.

FIG. 3 is an example of configuration of hardware block diagram of the robot 10 according to the embodiment. The robot 10 includes, for example, the control apparatus 30 used for controlling the processing or operation of the robot 10. As described above, the control apparatus 30 can be provided inside the housing 11 of the robot 10. Further, the control apparatus 30 may be provided outside the housing 11 of the robot 10, or may be provided as an apparatus separate from the robot 10.

As illustrated in FIG. 3, the control apparatus 30 includes, for example, a central processing unit (CPU) 301, read only memory (ROM) 302, random access memory (RAM) 303, hard disk drive (HDD) 304, media interface (I/F) 305, input/output I/F 306, audio input/output I/F 307, network I/F 308, short-range communication circuit 309, antenna 309a for the short-range communication circuit 309, external device connection I/F 311, and bus line 310.

The CPU 301 controls the robot 10 entirely. The CPU 301 is a computing device for implementing each function of the robot 10 by reading programs or data stored in the ROM 302 or a hard disk (HD) 304a and processing the programs or data on the RAM 303.

The ROM 302 is a nonvolatile memory that can retain the programs or data even if the power is turned off. The RAM 303 is a volatile memory that is used as a work area of the CPU 301. The HDD 304 controls the reading or writing of various data with the HD 304a under the control of the CPU 301. The HD304a stores various data, such as programs. The media I/F 305 controls the reading or writing of data with a recording medium 305a, such as universal serial bus (USB) memory, memory card, optical disk, or flash memory.

The input/output I/F 306 is an interface for inputting and outputting characters, numbers, various instructions or the like with various external devices. The input/output I/F 306 controls displaying of various information, such as cursor, menu, window, characters, images, or the like, on the display 14, such as liquid crystal display (LCD). Further, the display 14 may be a touch panel display equipped with an input unit. Further, the input/output I/F 306 may be connected to an input unit, such as mouse, keyboard, or the like, in addition to the display 14.

The audio input/output I/F 307 is a circuit for processing inputting and outputting audio signals with a microphone 307a and a speaker 307b under the control of the CPU 301. The microphone 307a is a built-in type audio collecting unit that inputs audio signals under the control of the CPU 301. The speaker 307b is a reproducing unit that outputs audio signals under the control of the CPU 301.

The network I/F 308 is a communication interface that performs communication (connection) with another device or apparatus via the communication network 9. The network I/F 308 is, for example, a communication interface such as, a wired or wireless local area network (LAN). Further, the network I/F 308 may include communication interface, such as 3G (third Generation), LTE (Long Term Evolution), 4G (fourth Generation), 5G (fifth Generation), Wi-Fi, WiMAX (Worldwide Interoperability for Microwave Access), Zigbee (registered trademark), or millimeter wave radio communication.

The short-range communication circuit 309 is a communication circuit, such as near field communication (NFC) or Bluetooth (registered trademark). The external device connection I/F 311 is an interface for connecting the control apparatus 30 to the other device.

The bus line 310 is address bus and data bus for electrically connecting each of the components described above, and transmits address signals, data signals, various control signals, or the like. The CPU 301, ROM 302, RAM 303, HDD 304, media I/F 305, input/output I/F 306, audio input/output I/F 307, network I/F 308, short-range communication circuit 309 and external device connection I/F 311 are connected with each other via the bus line 310.

Further, the control apparatus 30 is connected to a drive motor 101, an actuator 102, an acceleration and orientation sensor 103, a global positioning system (GPS) receiver 104, the image capture device 12, and a power supply unit 105 via the external device connection I/F 311.

The drive motor 101 rotationally drives the movement mechanism 15 based on instructions from the CPU 301 to move the robot 10 on a surface, such as ground. The actuator 102 transforms the manipulation arm 16 based on instructions from the CPU 301. The acceleration and orientation sensor 103 is a sensor, such as electromagnetic compass for detecting geomagnetic magnetism, gyro compass, and acceleration sensor. The GPS receiver 104 receives GPS signals from one or more GPS satellites. The power supply unit 105 is a unit that supplies power necessary for the entire robot 10.

(Hardware Configuration of Administrator Terminal)

Figure 4:
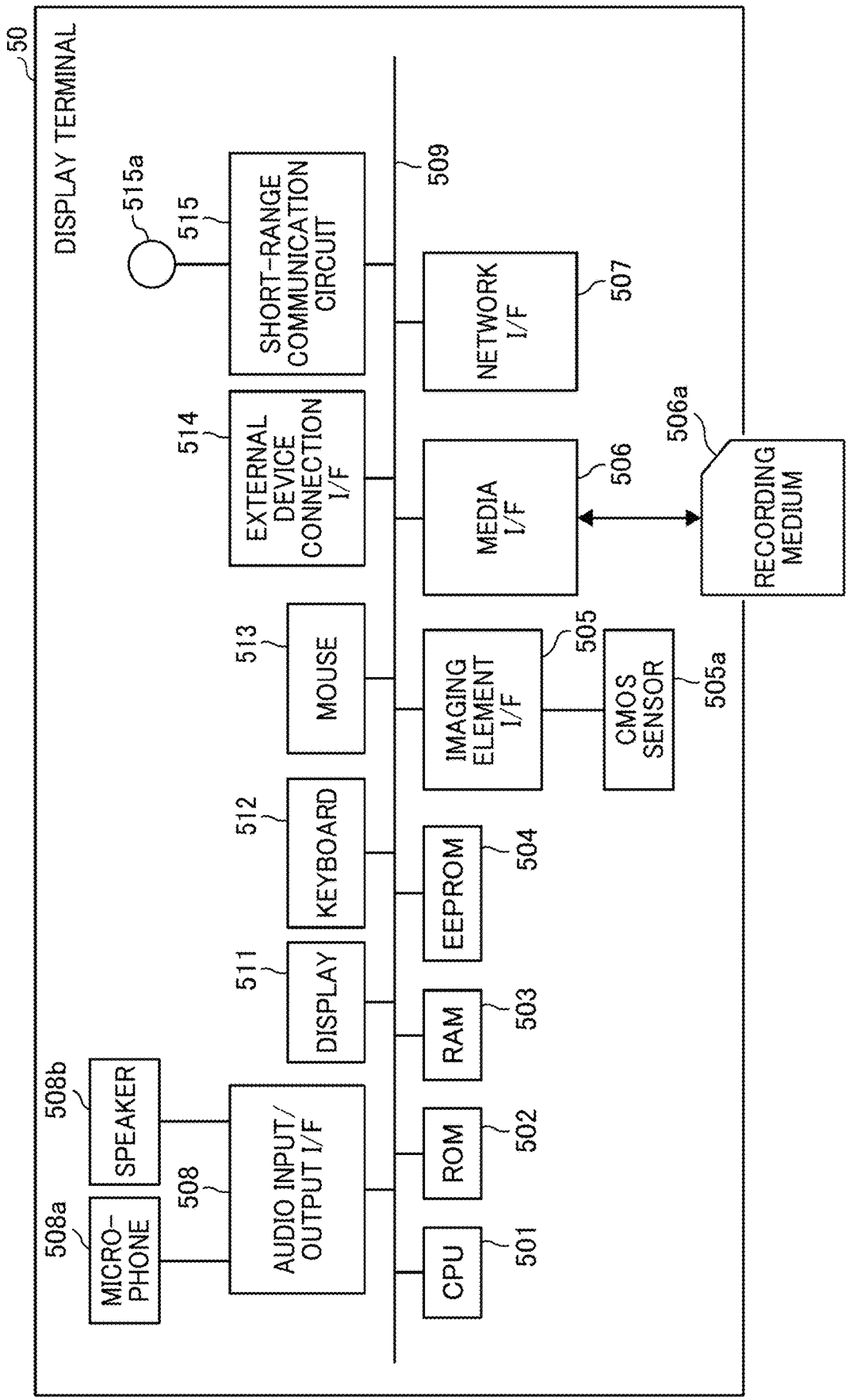
FIG. 4 is an example of configuration of hardware block diagram of a display terminal according to an embodiment of this disclosure.

FIG. 4 is an example of configuration of hardware block diagram of the display terminal 50 according to the embodiment. The display terminal 50 includes, for example, CPU 501, ROM 502, RAM 503, electrically erasable programmable read-only memory (EEPROM) 504, imaging element I/F 505, complementary metal oxide semiconductor (CMOS) sensor 505a, and media I/F 506.

The CPU 501 controls the operation of the display terminal 50 entirely. The CPU 501 is a computing device for implementing functions of the display terminal 50 by reading programs or data stored in the ROM 502 and processing the programs or data on the RAM 503.

The ROM 502 stores programs used for driving the CPU 501, such as an initial program loader (IPL). The RAM 503 is used as a work area of the CPU 501. The EEPROM 504 reads or writes various data, such as the programs for the display terminal, under the control of the CPU 501.

The CMOS sensor 505a captures images of objects, such as self-image, under the control of the CPU 501, and acquires image data. The imaging element I/F 505 is a circuit that controls the driving of the CMOS sensor 505a. The media I/F 506 controls data reading or writing (storing) to the recording medium 506a, such as flash memory or the like.

Further, the display terminal 50 includes, for example, network I/F 507, audio input/output I/F 508, microphone 508a, speaker 508b, display 511, keyboard 512, mouse 513, external device connection I/F 514, short-range communication circuit 515, and antenna 515a for the short-range communication circuit 515.

The network I/F 507 is a communication interface that performs communication (connection) with another device or apparatus via the communication network 9. The network I/F 507 is, for example, a communication interface, such as wired or wireless LAN. Further, the network I/F 507 may include a communication interface, such as 3G, LTE, 4G, 5G, Wi-Fi, WiMAX, Zigbee, or millimeter wave radio communication.

The audio input/output I/F 508 is a circuit for processing inputting and outputting audio signals with the microphone 508a and the speaker 508b under the control of the CPU 501. The microphone 508a is a built-in type audio collecting unit that inputs audio signals under the control of the CPU 501. The speaker 508b is a reproducing unit that outputs audio signals under the control of the CPU 501.

The display 511 is a type of display unit, such as liquid crystal display and organic electroluminescent (OEL) display, which displays images of objects and various icons. Further, the display 511 may be a touch panel display having with an input unit.

The keyboard 512 is a type of input unit including a plurality of keys for inputting characters, numerical numbers, various instructions, or the like. The mouse 513 is a type of input unit for selecting various instructions, selecting processing and executing target, moving a cursor, or the like.

The external device connection I/F 514 is an interface for connecting various external devices. The short-range communication circuit 515 is a communication circuit using, such as NFC or Bluetooth.

The display terminal 50 is further provided with a bus line 509. The bus line 509 is an address bus or a data bus for electrically connecting each component, such as the CPU 501 illustrated in FIG. 4.

(Hardware Configuration of Server)

Figure 5:
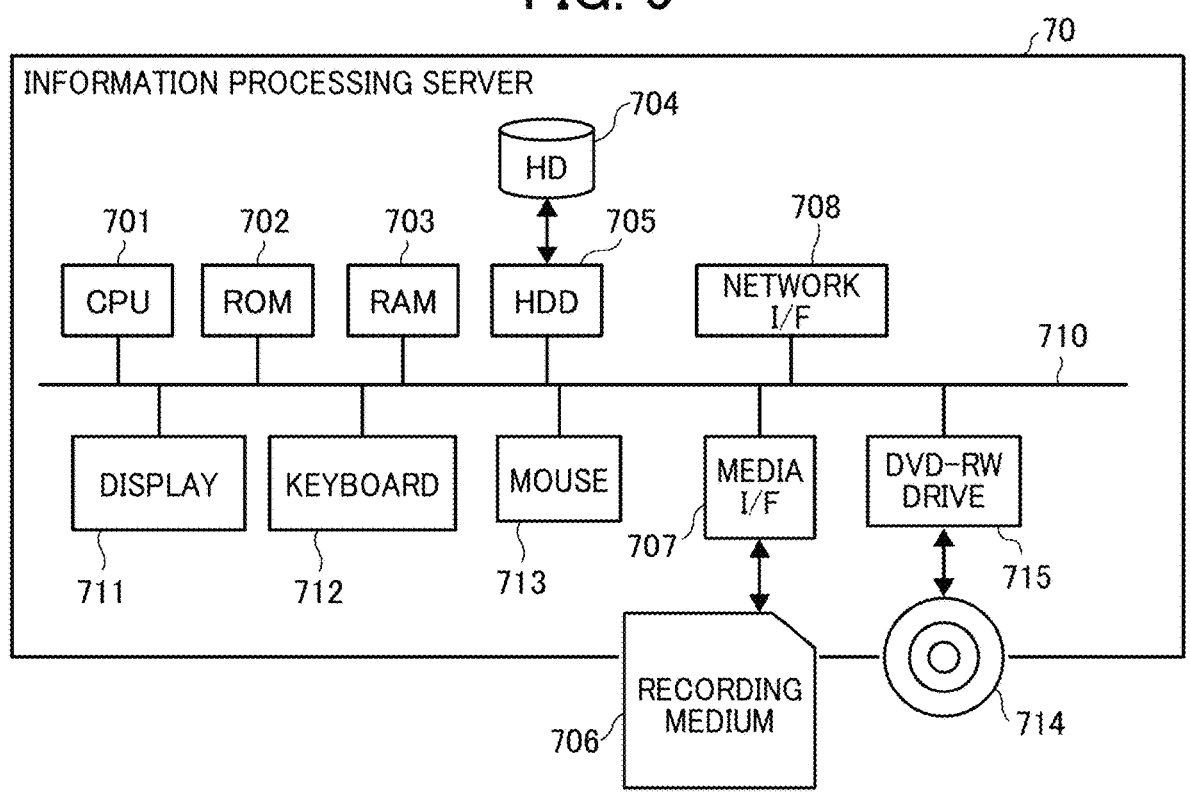
FIG. 5 is an example of configuration of hardware block diagram of an information processing server according to an embodiment of this disclosure.

FIG. 5 is an example of configuration of hardware block diagram of the information processing server 70 according to the embodiment. The information processing server 70 can be configured using a general computer. The information processing server 70 includes, for example, CPU 701, ROM 702, RAM 703, HD 704, HDD 705, media I/F 707, network I/F 708, display 711, keyboard 712, mouse 713, digital versatile disk rewritable (DVD-RW) drive 715, and bus line 710.

The CPU 701 controls the operation of the information processing server 70 entirely. The ROM 702 stores programs used for driving the CPU 701. The RAM 703 is used as a work area of the CPU 701.

The HDD 705 controls reading or writing of various data with the HD 704 under the control of the CPU 701. The HD 704 stores various data, such as programs. The media I/F 707 controls reading and writing (storing) data with a recording medium 706, such as flash memory.

The network I/F 708 is an interface for data communication using the communication network 9. The display 711 displays various information, such as cursor, menu, window, characters, images, or the like.

The keyboard 712 is a type of input unit including a plurality of keys for inputting characters, numerical numbers, various instructions, or the like. The mouse 713 is a type of input unit for is a type of input unit for selecting various instructions, selecting processing and executing target, moving a cursor, or the like.

The DVD-RW drive 715 controls reading or writing of various data with DVD-RW 714 used as an example of removable recording medium. The removable recording medium is not limited to DVD-RW, but can be DVD-R or the like. Further, the DVD-RW drive 715 may be Blu-ray drive that controls reading or writing of various data with Blu-ray (registered trademark) Disc Rewritable (BD-RE), or CD-RW drive that controls reading or writing of various data with compact disc disc-rewritable disc (CD-RW).

Further, the information processing server 70 includes, for example, bus line 710. The bus line 710 is address bus and data bus for electrically connecting each component, such as the CPU 701 illustrated in FIG. 5.

Further, each of the programs may be prepared as files of installable format or executable format, and may be recorded on a computer-readable recording medium, and distributed. The computer-readable recording medium includes, for example, compact disc recordable CD-R), DVD, Blu-ray Disc, secure digital (SD) card, or the like. Further, the recording medium can be provided as program product in one country or abroad. For example, the control apparatus 30, the display terminal 50, the information processing server 70 can be configured to implement an information processing method according to the embodiment by executing programs of the embodiment.

(Functional Configuration of Display Control System)

Figure 6:
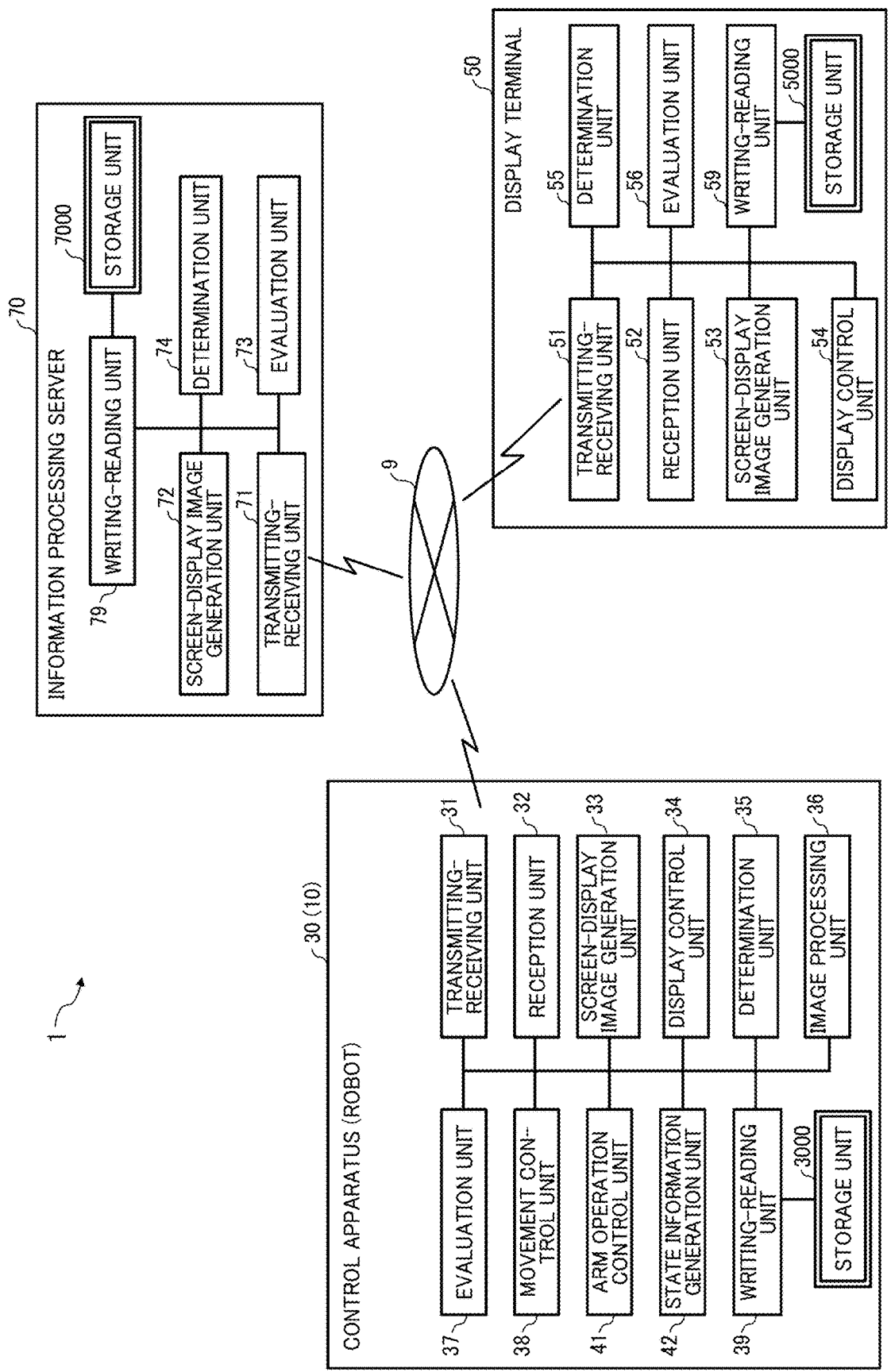
FIG. 6 is an example of configuration of functional block diagram of a display control system according to an embodiment of this disclosure.
Figure 7:
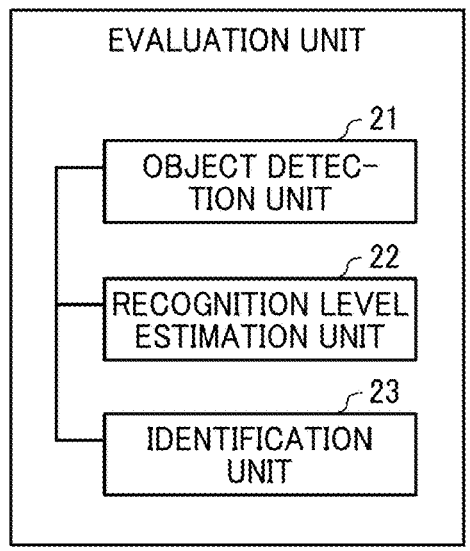
FIG. 7 is an example of configuration of functional block diagram of an evaluation unit according to an embodiment of this disclosure.

Hereinafter, a description is given of a functional configuration of the display control system 1 according to the embodiment with reference to FIGS. 6 and 7. FIG. 6 is an example of configuration of functional block diagram of the display control system 1. FIG. 6 illustrates the terminal, apparatus, device, and server illustrated in FIG. 1, which are related to processing or operation to be described later.

(Functional Configuration of Control Apparatus)

Hereinafter, with reference to FIG. 6, a description is given of functional configuration of the control apparatus 30 for controlling the processing or operation of the robot 10. The control apparatus 30 includes, for example, transmitting-receiving unit 31, reception unit 32, screen-display image generation unit 33, display control unit 34, determination unit 35, image processing unit 36, evaluation unit 37, movement control unit 38, arm operation control unit 41, state information generation unit 42, and writing-reading unit 39. Each of these components is a function or a function that is implemented by the operation of a program in which one of the components illustrated in FIG. 3 is operated by the CPU 301 according to a program deployed on the RAM 303.

Further, the control apparatus 30 includes, for example, storage unit 3000 implemented by the ROM 302, the HD 304a or the recording medium 305 illustrated in FIG. 3. The control apparatus 30 is an example of output control apparatus.

The transmitting-receiving unit 31, implemented by the instruction received from the CPU 301 and the network I/F 308 (see FIG. 3), is a functional unit that transmits or receives various data or information to or from other devices via the communication network 9. For example, the transmitting-receiving unit 31 transmits or outputs screen-display image data related to screen-display image generated by the screen-display image generation unit 33 to the display terminal 50. The transmitting-receiving unit 31 is an example of output unit or means.

The reception unit 32, implemented by the instruction received from the CPU 301 and the input/output I/F 306 (see FIG. 3), is a functional unit that receives an operation input to the input unit, such as the display 14.

The screen-display image generation unit 33, implemented the instruction received from the CPU 301 (see FIG. 3), is a functional unit that generates a screen-display image displayed on a given display unit. For example, the screen-display image generation unit 33 generates a screen-display image using an image acquired by the image processing unit 36 and evaluation data, which is evaluation result obtained by the evaluation unit 37. The screen-display image generation unit 33 is an example of generation unit or means.

Further, the screen-display image generation unit 33 is an example of adjustment unit or means.

The display control unit 34, implemented by the instruction received from the CPU 301 and the input/output I/F 306 (see FIG. 3), is a functional unit that displays various screens on the display 14. The display control unit 34 instructs the display 14 to display (output) the screen-display image related to the screen-display image data generated by the screen-display image generation unit 33. The display control unit 34 is an example of output unit or means. Further, the display control unit 34 is an example of display control unit or means.

The determination unit 35, implemented by the instruction received from the CPU 301 (see FIG. 3), is a functional unit that performs various determinations.

The image processing unit 36, implemented by the instruction received from the CPU 301 and the external device connection I/F 311 (see FIG. 3), is a functional unit that controls image capture processing by the image capture device 12. For example, the image processing unit 36 transmits instruction information for instructing an image capturing processing to be performed by the image capture device 12 to the image capture device 12. Further, the image processing unit 36 acquires, for example, the captured image data acquired by the image capture device 12, from the image capture device 12. The image processing unit 36 is an example of acquisition unit or means.

The evaluation unit 37, implemented by the instruction received from the CPU 301 (see FIG. 3), is a functional unit that evaluates the captured image data acquired by the image processing unit 36. For example, the evaluation unit 37 selects an object to be explicitly presented to an observing person using the captured image data acquired by the image processing unit 36. In this description, the observing person is a person who visually recognizes an object of observation target (observation-target object) included in the image displayed on the robot 10 or the display terminal 50. The observing person is, for example, an operator who remotely controls a movable apparatus, such as the robot 10, using the display terminal 50. The detailed configuration of the evaluation unit 37 will be described later.

The movement control unit 38, implemented by the instruction received from the CPU 301 and the external device connection I/F 311 (see FIG. 3), is a functional unit that drives the movement mechanism 15 to control a movement of the robot 10. For example, the movement control unit 38 controls driving of the movement mechanism 15 based on the operation command transmitted from the display terminal 50 to move the robot 10.

The arm operation control unit 41, implemented by the instruction received from the CPU 301 and the external device connection I/F 311 (see FIG. 3), is a functional unit that controls an operation of the manipulation arm 16. For example, the arm operation control unit 41 transforms the manipulation arm 16 based on an operation command transmitted from the display terminal 50 to change a direction of the manipulation arm 16.

The state information generation unit 42, implemented by the instruction received from the CPU 301 and the external device connection I/F 311 (see FIG. 3), is a functional unit that generates state information indicating a state of the robot 10. The state information generation unit 42 generates the state information indicating the state of the robot 10 using, for example, remaining battery level of the robot 10 acquired from the power supply unit 105, weight of the robot 10, and the movement state of the robot 10.

The writing-reading unit 39, implemented by the instruction received from the CPU 301 (see FIG. 3), is a functional unit that stores various data into the storage unit 3000 or reads various data from the storage unit 3000. The storage unit 3000 overwrites the image data and audio data that are received during a communication with the display terminal 50 every time the image data and audio data is received. Among these data, image data before being overwritten is displayed as an image on the display 14, and audio data before being overwritten is output as audio from the speaker 307b. Further, the storage unit 3000 stores the captured image data acquired by the image processing unit 36.

Further, the captured image data stored in the storage unit 3000 may be deleted when a given time period has elapsed after the captured image data was acquired by the image processing unit 36, or the data transmitted to the display terminal 50 may be deleted from the storage unit 3000.

(Configuration of Evaluation Unit)

Hereinafter, with reference to FIG. 7, a description is given of functional configuration of the evaluation unit 37 in detail. FIG. 7 is an example of configuration of functional block diagram of the evaluation unit 37 according to the embodiment. As illustrated in FIG. 7, the evaluation unit 37 includes, for example, object detection unit 21, recognition level estimation unit 22, and identification unit 23.

The object detection unit 21 is a functional unit that detects one or more target objects among objects included in the image data acquired by the image processing unit 36. The object detection unit 21 using any pattern recognition processing, such as semantic segmentation, to detect one or more target objects in the captured image. Hereinafter, the term of target object may mean one or more target objects. The target object to be detected is, for example, an object that may become obstacle for movement of the robot 10 or a person or object among objects included in the image data that may be presented to an observing person with some reasons. The object detection unit 21 is an example of detection unit or means.

The recognition level estimation unit 22 is a functional unit that estimate a recognition level of the target object detected by the object detection unit 21 for the observing person. For example, the recognition level estimation unit 22 uses the captured image data acquired by the image processing unit 36 to generate a saliency map, and estimates the recognition level of the target object detected by the object detection unit 21.

In this description, the saliency is an indicator indicating a level of attracting the attention of the observing person (person), and data estimating the levels of attracting the attention for each pixel (pixel) of the image is referred to as the saliency map. The saliency map extracts a region where the visual attention of the observing person is likely to be induced using visualized marking based on quantified visual attention level of the observing person. Further, the saliency map is composed of numerical values set for each pixel based on visual attention level of each pixel, and has an evaluation value on the recognition level of the observing person on each pixel. The recognition level estimation unit 22 is an example of recognition level estimation unit or means.

The identification unit 23 uses the object detection result obtained by the object detection unit 21 and the recognition level estimation result obtained by the recognition level estimation unit 22 to identify one or more target objects having lower recognition level among the objects included in the captured image data. For example, the identification unit 23 identifies the one or more target objects having lower recognition level among the objects detected by the object detection unit 21 based on the estimated recognition level. The identification unit 23 is an example of identification unit or means.

(Functional Configuration of Display Terminal)

Hereinafter, with reference to FIG. 6, a description is given of functional configuration of the display terminal 50. The display terminal 50 includes, for example, transmitting-receiving unit 51, reception unit 52, screen-display image generation unit 53, display control unit 54, determination unit 55, evaluation unit 56, and writing-reading unit 59. Each of these units is a functional unit or function that is implemented by any of the components illustrated in FIG. 4 under the instructions received from the CPU 501 executing programs loaded on the RAM 503. Further, the display terminal 50 includes storage unit 5000, implemented by the ROM 502 or the recording medium 506a illustrated in FIG. 4. Further, the display terminal 50 is installed with one or more dedicated application programs for remotely controlling the robot 10. The display terminal 50 implements each function by executing, for example, the installed application programs by the CPU 501. The display terminal 50 is an example of output control apparatus.

The transmitting-receiving unit 51, implemented by the instruction received from the CPU 501 and the network I/F 507 (FIG. 4), is a functional unit that transmits or receives various data or information to or from other devices via the communication network 9. For example, the transmitting-receiving unit 51 receives the screen-display image data transmitted from the robot 10 (control apparatus 30) via the communication network 9. Further, for example, the transmitting-receiving unit 51 receives the captured image data transmitted from the robot 10 (control apparatus 30), and the evaluation data indicating the image evaluation result obtained by the evaluation unit 37. The transmitting-receiving unit 51 is an example of acquisition unit.

The reception unit 52, implemented by the instruction received from the CPU 501 and the input unit or means such as the keyboard 512 or the mouse 513 (see FIG. 4), is a functional unit that receives various selection or operation input to the display terminal 50.

The screen-display image generation unit 53, implemented by the instruction received from the CPU 501 (see FIG. 4), is a functional unit that generates a screen-display image displayed on a given display unit. For example, the screen-display image generation unit 53 generates the screen-display image using the captured image data received by the transmitting-receiving unit 51 and the evaluation data, which is the evaluation result obtained by the evaluation unit 56. The screen-display image generation unit 53 is an example of generation unit. Further, the screen-display image generation unit 53 is an example of adjustment unit or means.

The display control unit 54, implemented by the instruction received from the CPU 501 (see FIG. 4), displays various screens on the display 511 of the display terminal 50. For example, the display control unit 54 instructs the display 511 to display the screen-display image related to the screen-display image data transmitted from the robot 10 (control apparatus 30). Further, for example, the display control unit 54 instructs the display 511 to display the screen-display image data generated by the screen-display image generation unit 53 on the display 511. The display control unit 54 is an example of output unit or means. Further, the display control unit 54 is an example of display control unit or means.

The determination unit 55, implemented by the instruction received from the CPU 501 (see FIG. 4), is a functional unit that performs various determinations.

The evaluation unit 56, implemented by the instruction received from the CPU 501 (see FIG. 4), is a functional unit that evaluates the captured image data acquired from the robot 10 (control apparatus 30). Since the detailed configuration of the evaluation unit 56 is similar to that of the configuration illustrated in FIG. 7, the description thereof will be omitted.

The writing-reading unit 59, implemented by the instruction received from the CPU 501 (see FIG. 4), is a functional unit that stores various data into the storage unit 5000 or reads various data from the storage unit 5000. The storage unit 5000 overwrites the image data and audio data that are received during a communication with the robot 10 (control apparatus 30) every time the image data and audio data is received. Among these data, image data before being overwritten is displayed as an image on the display 511, and audio data before being overwritten is output as audio from the speaker 508b.

(Functional Configuration of Information Processing Server)

Hereinafter, with reference to FIG. 6, a description is given of functional configuration of the information processing server 70. The information processing server 70 includes, for example, transmitting-receiving unit 71, screen-display image generation unit 72, evaluation unit 73, determination unit 74, and writing-reading unit 79. Each of these units is a functional unit or function that is implemented by any of the components illustrated in FIG. 5 under the instructions received from the CPU 701 executing programs loaded on the RAM 703. Further, the information processing server 70 includes storage unit 7000, implemented by the ROM 702, the HD 704, and the recording medium 706 illustrated in FIG. 5. The information processing server 70 is an example of output control apparatus.

The transmitting-receiving unit 71, implemented by the instruction received from the CPU 701 and the network I/F 708 (FIG. 5), is a functional unit that transmits or receives various data or information to or from other devices via the communication network 9. For example, the transmitting-receiving unit 71 receives or acquires the captured image data transmitted from the robot 10 (control apparatus 30). Further, for example, the transmitting-receiving unit 71 transmits or outputs the screen-display image data generated by the screen-display image generation unit 72 to the display terminal 50 or the robot 10 (control apparatus 30). The transmitting-receiving unit 71 is an example of acquisition unit or means. Further, the transmitting-receiving unit 71 is an example of output unit or means. Further, the transmitting-receiving unit 71 is an example of receiving unit or means. Further, the transmitting-receiving unit 71 is an example of transmitting unit or means.

The screen-display image generation unit 72, implemented by the instruction received from the CPU 701 (see FIG. 5), is a functional unit that generates a screen-display image displayed on a given display unit. The screen-display image generation unit 72 generates the screen-display image data to be transmitted to other device using the captured image data received by the transmitting-receiving unit 71 and the evaluation data, which is the evaluation result obtained by the evaluation unit 73. The screen-display image generation unit 72 is an example of generation unit or means. Further, the screen-display image generation unit 72 is an example of adjustment unit or means.

The evaluation unit 73, implemented by the instruction received from the CPU 701 (see FIG. 5), is a functional unit that evaluates the captured image data acquired from the robot 10 (control apparatus 30). Since the detailed configuration of the evaluation unit 73 is similar to that of the configuration illustrated in FIG. 7, the description thereof will be omitted.

The determination unit 74, implemented by the instruction received from the CPU 701 (see FIG. 5), is a functional unit that performs various determinations.

The writing-reading unit 79, implemented by the instruction received from the CPU 701 (see FIG. 5), is a functional unit that stores various data into the storage unit 7000 or reads various data from the storage unit 7000. Further, when the information processing server 70 has a function of managing or controlling communication between the robot 10 and the display terminal 50, the storage unit 7000 stores various setting information used for establishing a communication session used for performing a remote communication between the robot 10 and the display terminal 50.

(Processing and Operation)

Hereinafter, with reference to FIGS. 8 to 16, a description is given of processing and operation of the display control system 1 according to the embodiment. In the following description, the processing performed by the control apparatus 30 provided for the robot 10 is described as the processing performed by the robot 10.

Further, it is assumed that a communication session used for performing a remote communication using a communication management server, such as an information processing server 70, is established between the robot 10 and the display terminal 50. The robot 10 and the display terminal 50 can perform the remote communication using the established communication session.

(Processing of Displaying Site Image)

Figure 8:
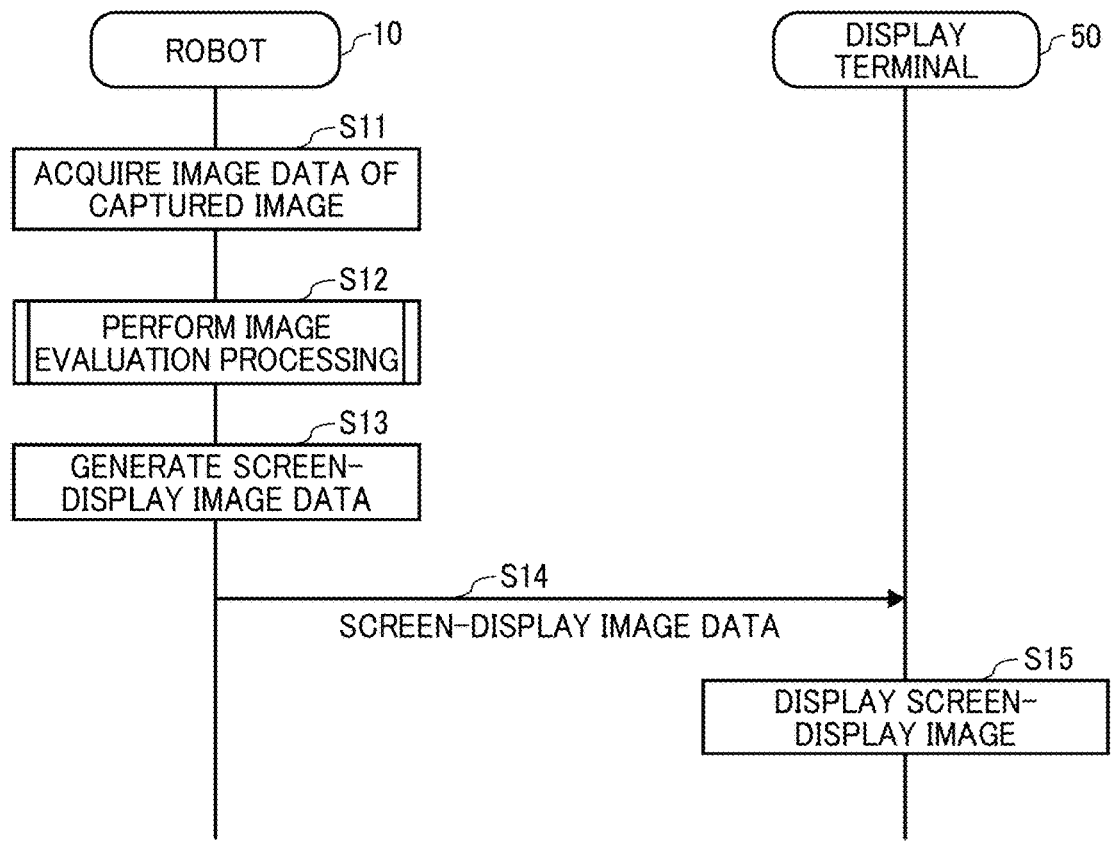
FIG. 8 is an example of sequence diagram of displaying a site image using a display control system according to an embodiment of this disclosure.

Hereinafter, with reference to FIGS. 8 to 14, a description is given of processing of displaying the image (site image) captured by the image capture device 12 of the robot 10 on the display terminal 50 located at a remote location. FIG. 8 is an example of sequence diagram of displaying a site image using the display control system 1 according to the embodiment.

At first, the image processing unit 36 of the robot 10 acquires an image (e.g., site image) captured by the image capture device 12 as the captured image (step S11). Specifically, the robot 10 starts to an image capture operation using the image capture device 12 based on an image capture instruction transmitted to the image capture device 12 from the image processing unit 36. Then, the image processing unit 36 acquires image data of the captured image, acquired by the image capture device 12, from the image capture device 12. Hereinafter, the image data of the captured image may be referred to as the captured image data.

Figure 9:
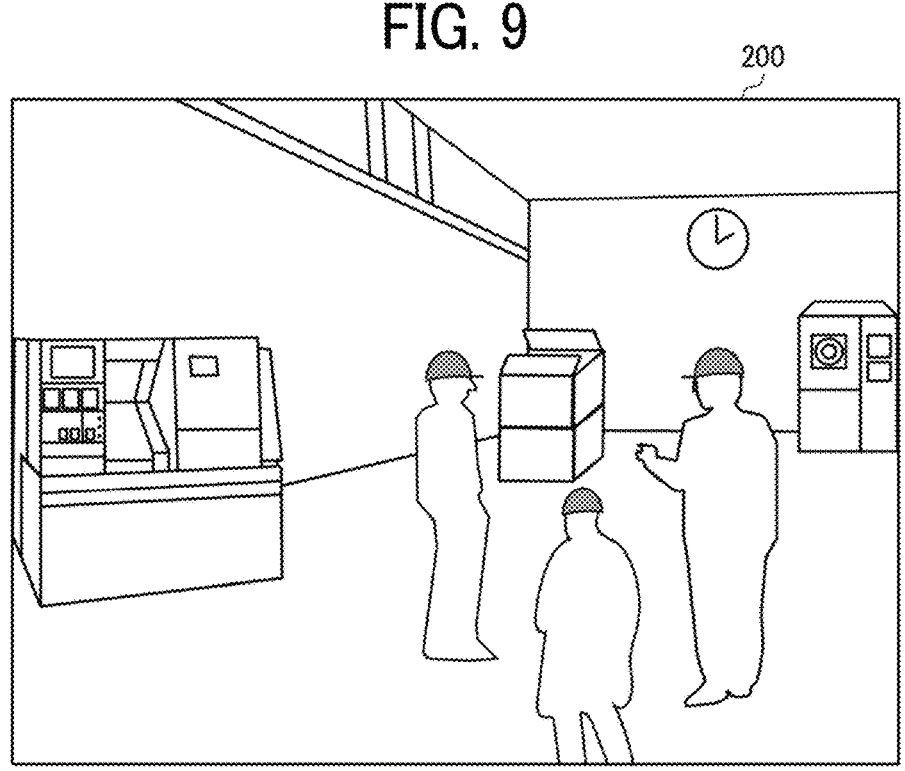
FIG. 9 is an example of captured image acquired by a robot according to an embodiment of this disclosure.

FIG. 9 is an example of captured image 200 acquired by the robot 10 according to the embodiment. As illustrated in FIG. 9, the captured image 200 includes images of things or objects, such as persons, objects, or scene at a site where the robot 10 is located or disposed. For example, if the site where the robot 10 is located is a factory, the things or objects included in the captured image 200 includes, for example, various devices, such as machine tools, and workers who work in the factory. In this description, when the image capture device 12 captures images at the site, the image capture device 12 captures images of things or objects present at the site, and then some of the things or objects present at the site may be specified as the target object (observation target object), which becomes the target that is to be observed by a person, which may be referred to as an observing person.

Then, the evaluation unit 37 of the robot 10 performs the image evaluation processing for generating an image to be presented to the observing person using the captured image data acquired by the image processing unit 36 (step S12).

(Image Evaluation Processing)

Figure 10:
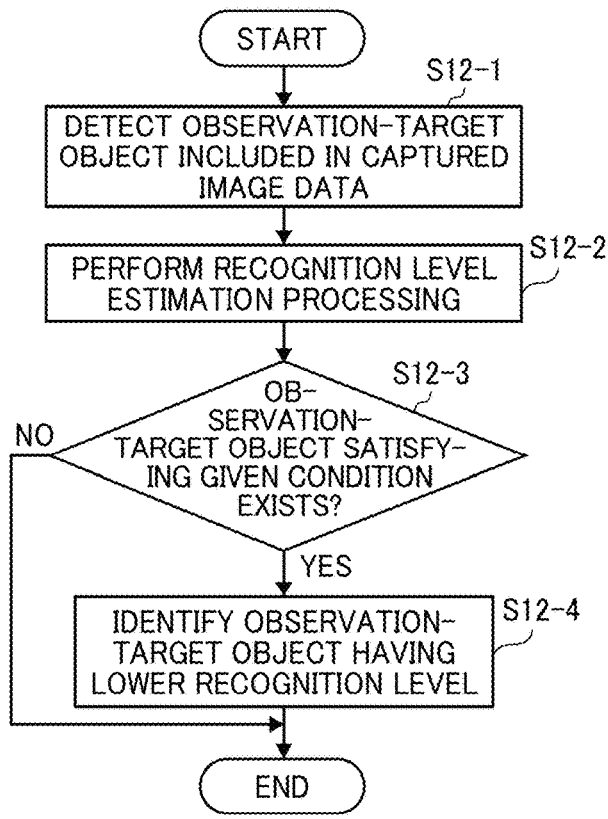
FIG. 10 is an example of a flowchart of image evaluation processing performed by an evaluation unit according to an embodiment of this disclosure.

Hereinafter, with reference to FIG. 10, a description is given of the image evaluation processing performed by the evaluation unit 37 in detail. FIG. 10 is an example of a flowchart of image evaluation processing performed by the evaluation unit 37 according to the embodiment.

At first, the object detection unit 21 detects an observation-target object included in the captured image data acquired by the image processing unit 36 (step S12-1). Specifically, the object detection unit 21 detects the observation-target object included in the captured image data using given pattern recognition processing (object recognition processing). The pattern recognition processing can be performed using known detection methods, such as semantic segmentation method. The method used for pattern recognition processing is not limited thereto, but can use any method.

Figure 11:
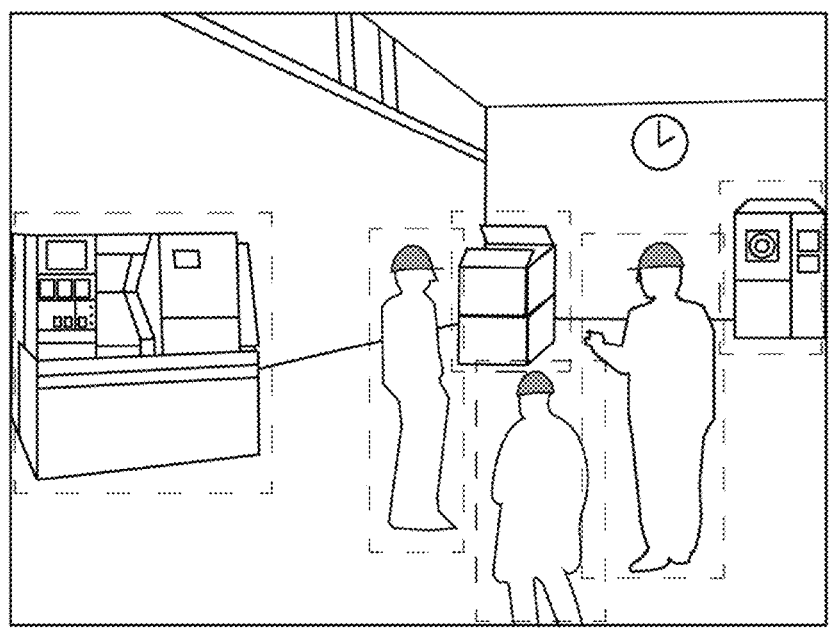
FIG. 11 is an example of a diagram describing a detection result obtained by an object detection unit according to an embodiment of this disclosure.

Hereinafter, with reference to FIG. 11, a description is given of object detection result obtained or acquired by the object detection unit 21. FIG. 11 is an example of a diagram describing a detection result obtained by the object detection unit 21. In FIG. 11, the target object detected by the object detection processing is indicated by a dotted line. The detected target object (observation-target object) can be, for example, machines or workers among objects included in the captured image 200 illustrated in FIG. 9. The target object detected by the object detection processing is, for example, an object that may become obstacle for the movement of the robot 10 or an image of object that may be presented to an observing person with some reason.

With this configuration, the object detection unit 21 can detect the observation-target object to be viewed by the observing person from the captured image, in which the objects in the site are captured by the image capture device 12.

Then, the recognition level estimation unit 22 performs the recognition level estimation processing using the captured image data acquired by the image processing unit 36 (step S12-2). Specifically, the recognition level estimation unit 22 uses the captured image data acquired by the image processing unit 36 to generate a saliency map, and estimates the recognition level of the observation-target object detected by the step S12-1 based on the saliency map.

The method of generating the saliency map can use known methods, such as methods disclosed in non-patent document 1, and non-patent document 2.

Non-patent document 1: L. Itti, C. Koch, and E. Niebur. "A model of saliency-based visual attention for rapid scene analysis," IEEE Transactions on Pattern Analysis and Machine Intelligence, Vol. 20, No. 11, pp. 1254-1259, 1998.

Non-patent document 2: J. Harel, C. Koch, and P. Perona, "Graph-based visual saliency," Advances in Neural Information Processing Systems, pp. 545-552, 2007.

For example, the recognition level estimation unit 22 uses any one of features of luminance, complement color, and saturation or a combination of these features of things or objects included in the captured image 200 to generate the saliency map that quantifies the recognition level.

Further, if the image capture device 12 may be an image capture device, such as a stereo camera, that can obtain or acquire disparity images having depth information (distance information) indicating a depth of object, the recognition level estimation unit 22 can use the depth information indicating the depth of object as one of the features.

Further, the recognition level estimation unit 22 can use information indicating the traveling direction of the robot 10 included in the state information generated by the state information generation unit 42 as one of the features.

Then, the recognition estimation unit 22 quantifies the recognition level based on the contrast or the height of value of these indexes indicating the features of the captured image 200 to estimate the recognition level of the observing person who views the captured image.

Figure 12:
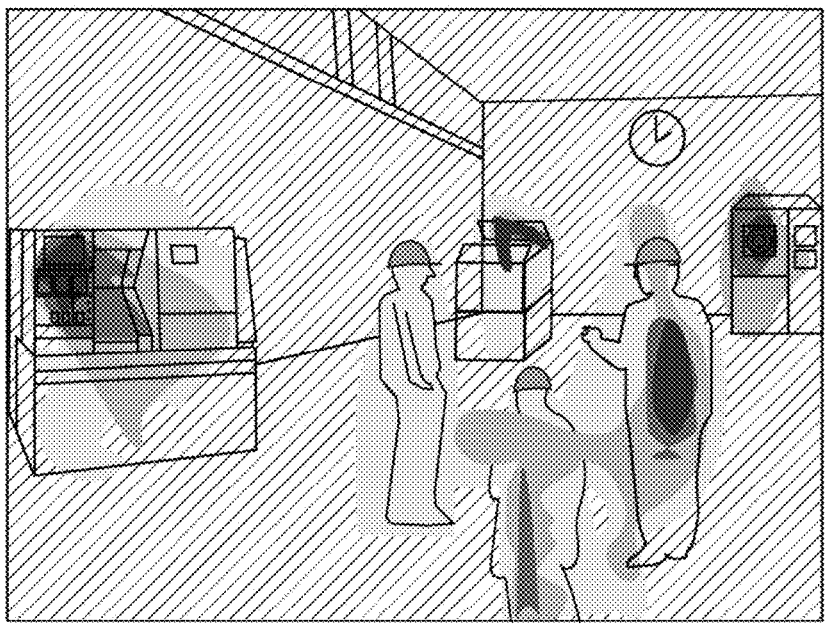
FIG. 12 is an example of a diagram describing a saliency map generated by a recognition level estimation unit according to an embodiment of this disclosure.

Hereinafter, with reference to FIG. 12, a description is given of estimation processing performed by the recognition level estimation unit 22. FIG. 12 is an example of a diagram describing a saliency map generated by the recognition level estimation unit 22. FIG. 12 is an example of result obtained by performing the recognition level estimation processing, which is visualized as a heat map. In an example of FIG. 12, the saliency map is generated using a contrast combination of luminance or color indexes. In the saliency map of FIG. 12, the higher the energy, the higher the recognition level of the observing person (easier to recognize), and the lower the energy, the lower the recognition level of the observing person (harder to recognize).

In this way, as to the saliency map, pixels that are more likely to attract person's attention has a larger evaluation value, and by associating the evaluation value with the density, the pixels that are more likely to attract person's attention can be displayed as a brighter image. Further, the saliency map can be expressed by associating the evaluation value with the hue, instead of using the heat map illustrated in FIG. 12.

In this configuration, the recognition level estimation unit 22 can estimate the recognition level of the target object (observation-target object) among the objects included in the captured image 200 by performing the recognition processing on the image data of the objects at the site captured by the image capture device 12. Although the recognition level estimation processing using the saliency map performed in step S12-2 has been described, the recognition level estimation processing is not limited to the method using the saliency map, but other method using the features of the captured image 200 as described above may be used. Further, the order of the object detection processing in step S12-1 and the recognition level estimation processing in step S12-2 may be changed or performed in parallel.

Then, the identification unit 23 performs the object identification processing for identifying an object having a lower recognition level (hereinafter, lower recognition level object identification processing) using the object detection result obtained or acquired in step S12-1 and the recognition estimation result obtained or acquired in step S12-2.

At first, the identification unit 23 uses the recognition level estimated in step S12-2 to determine whether or not any observation-target object satisfying a given condition exists among the observation-target object detected in step S12-1 (step S12-3).

Specifically, the identification unit 23 determines whether any observation-target object satisfying the given condition exists using the given condition for extracting an object having a lower recognition level. For example, at first, the identification unit 23 determines the maximum value or the average value of the recognition level of a region in the captured image 200 that corresponds to the observation-target object detected in step S12-1 as a representative value of the region.

Then, if the representative value of the determined recognition level becomes a given value or less, the identification unit 23 determines that an observation-target object satisfying a given condition exists.

Further, if a difference between the representative value of the recognition level of the specific target object (specific object) and the representative value of the recognition level of another target object (another object) becomes a given value or more, the identification unit 23 determines that an observation-target object (specific object, specific target object) satisfying the given condition exists.

If the identification unit 23 determines that the observation-target object satisfying the given condition exists among the observation-target object detected in step S12-1 based on the recognition level estimated in step S12-2 (step S12-3: YES), the identification unit 23 proceeds the sequence to step S12-4.

On the other hand, if the identification unit 23 determines that the observation-target object satisfying the given condition does not exist among the observation-target object detected in step S12-1 based on the recognition level estimated in step S12-2 (step S12-3: NO), the identification unit 23 terminates or ends the sequence.

Then, the identification unit 23 identifies the observation-target object corresponding to a region that is determined to satisfy the given condition in step S12-3 as the target object having the lower recognition level (step S12-4).

Figure 13:
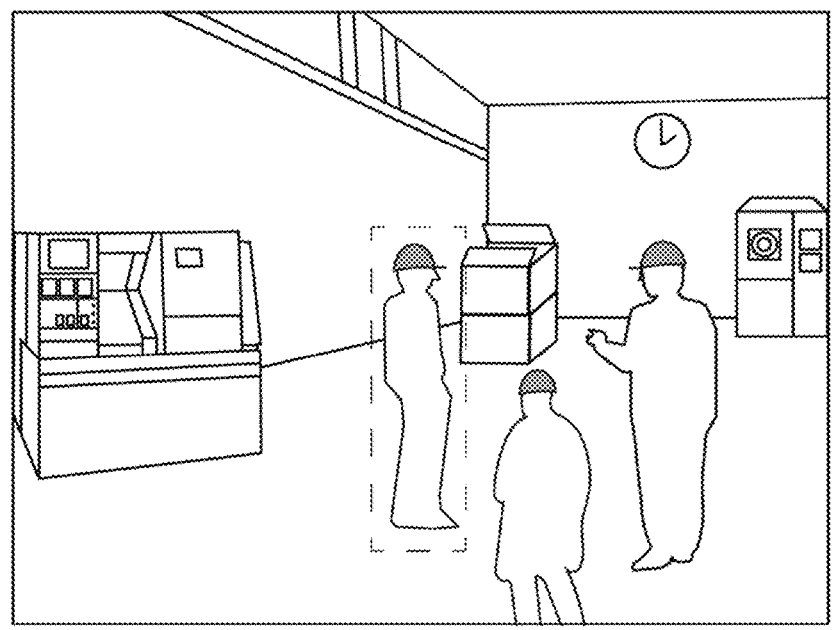
FIG. 13 is an example of diagram describing a specific result obtained by an identification unit according to an embodiment of this disclosure.

FIG. 13 is an example of diagram describing a specific result obtained or acquired by the identification unit 23. In FIG. 13, the target object identified by the lower recognition level object identification processing indicated by a dotted line. The target object having the lower recognition level (observation-target object) is an object that corresponds to a region of lower density (lower recognition level) in the saliency map illustrated in FIG. 12.

With this configuration, the identification unit 23 can identify the target object having the lower recognition level of the observing person among the objects included in the captured image 200 based on the object detection result obtained by the object detection processing, and the recognition estimation result obtained by the recognition level estimation processing.

Thus, the evaluation unit 37 of the robot 10 quantifies the visual perception or recognition of the observing person (person) using a calculation model of saliency map taking into account the contrast of luminance or color of the image to be presented to the observing person (person) to estimate a situation that a recognition in the captured image 200 is difficult for the observing person.

Then, the evaluation unit 37 calculates the energy of saliency map for the observation-target object detected by pattern recognition, and compares the calculated energy and the energy state that is difficult to recognize to extract only the target object that is difficult for the observing person to recognize.

Referring back to the sequence diagram of FIG. 8, the screen-display image generation unit 33 of the robot 10 uses the captured image data acquired by the image processing unit 36 and the evaluation data, which is the result of evaluation by the evaluation unit 37, to generate screen-display image data related to a screen-display image to be presented to the observing person (step S13).

Then, the transmitting-receiving unit 31 of the robot 10 transmits the screen-display image data generated by the screen-display image generation unit 33 to the display terminal 50 (step S14). Then, the transmitting-receiving unit 51 of the display terminal 50 receives the screen-display image data transmitted from the robot 10.

Then, the display control unit 54 of the display terminal 50 instructs the display 511 to display the screen-display image related to the screen-display image data received by the transmitting-receiving unit 51 (step S15).

Figure 14:
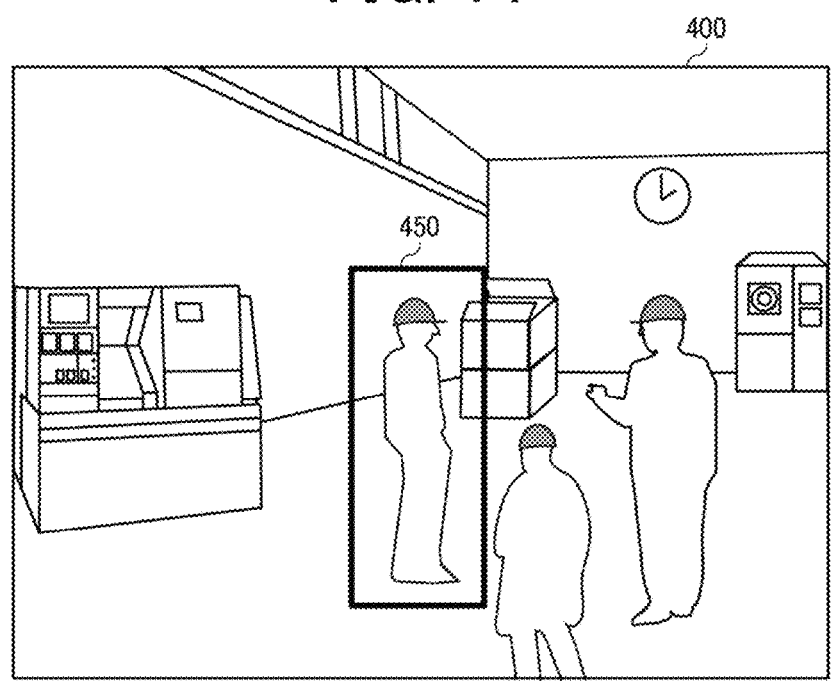
FIG. 14 is an example of screen-display image displayed on a display terminal according to an embodiment of this disclosure.

Hereinafter, with reference to FIG. 14, a description is given of the screen-display image displayed on the display terminal 50. FIG. 14 is an example of screen-display image displayed on the display terminal 50 according to the embodiment. The screen-display image 400 (FIG. 14) is a screen-display image related to the screen-display image data generated by the screen-display image generation unit 33 of the robot 10.

The screen-display image 400 displays additional information 450 applied to the region corresponding to the target object having the lower recognition level identified in step S12-4. Specifically, in step S13, the screen-display image generation unit 33 of the robot 10 uses coordinate information of the region corresponding to the target object having the lower recognition level identified in step S12-4 to generate the screen-display image data that superimposes the additional information 450 on the corresponding coordinate region of the captured image 200. Then, in step S15, the display terminal 50 receives the screen-display image data generated by the robot 10, and displays the screen-display image 400 related to the received screen-display image data on the display 511.

The additional information 450 is superimposed on the captured image 200 using the augmented reality (AR) technology. The AR technology is a technology that extends actual information by superimposing additional information, such as computer graphics (CG) over the real world. The additional information 450 is intended to present an object to the observing person by highlighting or pointing the object identified by the lower recognition level object identification processing described above.

The additional information 450 illustrated in FIG. 14 is constructed of a rectangular shape surrounding the object. Further, the type or shape of the additional information 450 is not limited thereto, but can be an image of an arrow pointing the object.

Thus, the display control system 1 can perform the AR displaying on only the object having the lower recognition level estimated by the recognition level estimation processing to prevent the distraction of the recognition level of the observing person caused by too many AR displaying, with which the display control system 1 can provide a suitable display screen for the observing person who views a plurality of objects, which may become the observation-target objects.

Further, since the display control system 1 displays the additional information 450 only to the object which is difficult to recognize for the observing person, for example, the display control system 1 can perform the necessary minimum emphasis expression compared with conventional methods in which the highlighting is performed on all of the objects subjected to the image observation. Therefore, the observing person is not disturbed with too many or excessive information when performing the remote control of the robot 10 using the screen-display image, with which the information displayed on the screen-display image can be more accurately recognized.

Further, the processing of the screen-display image data in step S14 of FIG. 8 may be performed by the display terminal 50. In this case, the transmitting-receiving unit 51 of the display terminal 50 receives the captured image data and the evaluation data indicating the evaluation result obtained by the evaluation unit 37 transmitted from the robot 10. Then, the screen-display image generation unit 53 of the display terminal 50 generates the screen-display image data related to the screen-display image 400 using the received image data and evaluation data.

Further, the display processing of the screen-display image in step S15 of FIG. 8 may be performed by the robot 10. In this case, the display control unit 34 of the robot 10 instructs the display 14 to display the screen-display image 400 related to the screen-display image data generated by the screen-display image generation unit 33.

(Adjustment Processing of Display Style)

Hereinafter, with reference to FIGS. 15 and 16, a description is given of processing of adjusting a display style of additional information included in a screen-display image related to screen-display image data generated by the screen-display image generation unit 33 before presenting the screen-display image to an observing person.

In this description, the display style of additional information is an appearance of the additional information displayed on a display. The adjustment of display style corresponds to changing the appearance of additional information, such as increasing (emphasis) or decreasing (suppression) of visual prominence of additional information.

The emphasis means to enhance the visual prominence of additional information, and the suppression means decreasing the visual prominence of additional information. The emphasis may also means making information easier to see, increasing attention attraction of information, enhancing recognition level of information, and increasing explicitness of information. Further, the suppression may also means making information less easier to see, decreasing attention attraction of information, lowering recognition level of information, and decreasing explicitness of information.

Hereinafter, with reference to FIG. 15, a description is given of a case of adding adjustment processing of display style to the display processing of site image illustrated in FIG. 8. FIG. 15 is an example of sequence diagram of display processing of site image when the adjustment processing of display style is performed in the display control system according to the embodiment. Since steps S31 to S33 in FIG. 15 are the same as in steps S11 to S13 in FIG. 8, the description thereof will be omitted.

The robot 10 performs the adjustment processing of display style of the additional information 450 (see FIG. 14) included in the screen-display image data using the screen-display image data generated in step S13 (step S34). FIG. 16 is an example of flowchart of the adjustment processing of display style according to the embodiment.

At first, the recognition level estimation unit 22 performs the recognition level estimation processing for the additional information 450 set for the screen-display image data generated in step S13 (step S34-1).

Specifically, the recognition level estimation unit 22 uses the screen-display image data acquired by the image processing unit 36 to generate a saliency map and estimate the recognition level of the observation-target object detected in step S12-1 based on the saliency map.

For example, the recognition level estimation unit 22 generates the saliency map quantifying the recognition level of the additional information 450 based on any one of indexes (e.g., luminance, complementary color, saturation) of the object and the additional information 450 set for the screen-display image data or a combination of indexes. Then, the recognition level estimation unit 22 quantifies the recognition level of the observing person recognizing the additional information 450 by quantifying the recognition level of the additional information 450 based on the contrast or the height of value of these indexes indicating the features of the screen-display image data.

Then, the determination unit 35 determines whether or not the recognition level of the additional information included in the screen-display image data satisfies a given condition used for adjusting the display style (step S34-2).

Specifically, the determination unit 35 determines the maximum value, average value, or median value of the region corresponding to the additional information included in the screen-display image data, which is the processing result of the recognition level estimation processing in step S34-1, as a representative value of the region corresponding to the additional information. Then, the determination unit 35 determines that the given condition is satisfied if the representative value of the recognition level of the additional information becomes a given value or more. In this case, the adjustment is performed to decrease or suppress the display style of additional information (e.g., decreasing of visual prominence of additional information) in the following processing.

Further, the determination unit 35 can be configured to determine that the given condition is satisfied if the representative value of the additional information becomes a given value or less. In this case, the adjustment is performed to increase or emphasize the display style of additional information (e.g., increasing of visual prominence of additional information) in the following processing.

If the recognition level of the additional information estimated in step S34-1 satisfies the given condition (step S34-2: YES), the determination unit 35 proceeds the sequence to step S34-3.

On the other hand, if the recognition level of the additional information estimated in step S34-1 does not satisfy the given condition (step S34-2: NO), the determination unit 35 terminates or ends the sequence.

Then, if the recognition level of the additional information satisfies the given condition (step S34-2: YES), the screen-display image generation unit 33 adjusts the display style of the additional information included in the screen-display image data (step S34-3).

Specifically, if the recognition level of the additional information is higher than the recognition level of other object and target object included in the screen-display image data, the screen-display image generation unit 33 performs the adjustment to decrease or suppress the display style of additional information.

On the other hand, if the recognition level of the additional information is lower than the other object and target object included in the screen-display image data, the screen-display image generation unit 33 adjusts the display style of additional information to increase or emphasize the display style of the additional information.

As described above, by changing any one of indexes (e.g., luminance, complementary color, saturation, size, shape, output timing) of the additional information, or a combination thereof, the screen-display image generation unit 33 can adjust the display style of additional information so that the recognition level of the additional information 450 becomes uniform or even with the recognition level of the object included in the screen-display image data.

Figure 15:
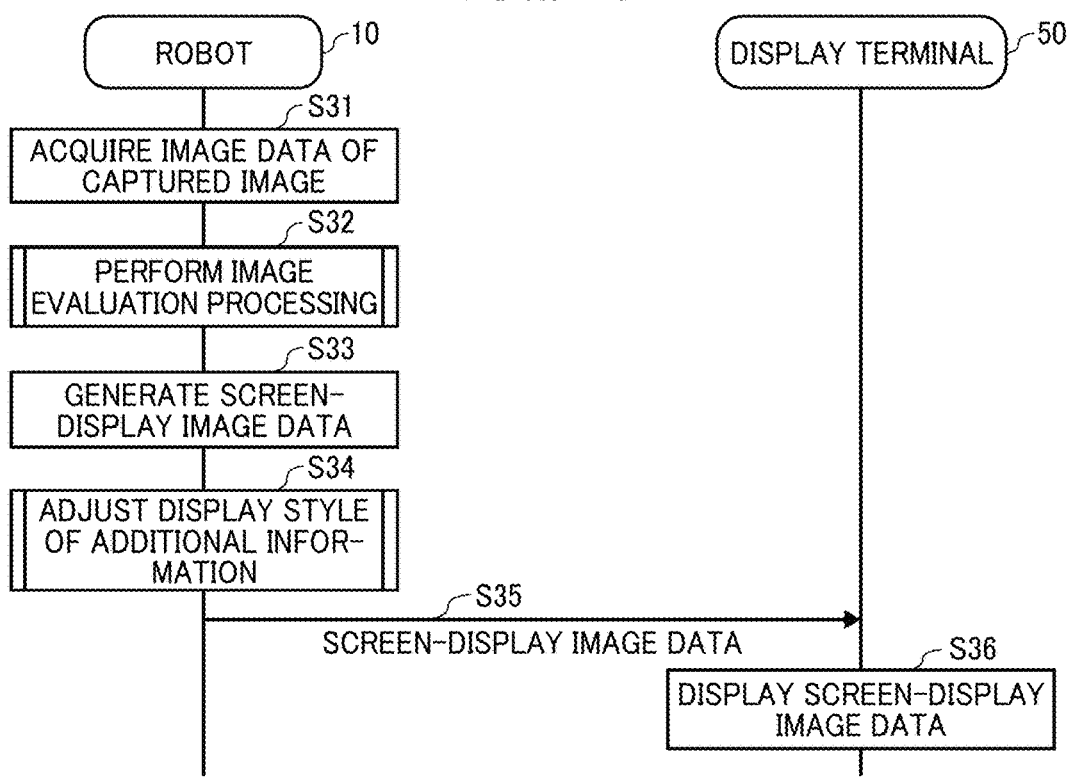
FIG. 15 is an example of sequence diagram of display processing of site image when adjustment processing of display style is performed in a display control system according to an embodiment of this disclosure.

Referring back to the sequence diagram of FIG. 15, the transmitting-receiving unit 31 of the robot 10 transmits the screen-display image data related to the screen-display image generated by the screen-display image generation unit 33 to the display terminal 50 (step S35). Then, the transmitting-receiving unit 51 of the display terminal 50 receives the screen-display image data transmitted from the robot 10.

Then, the display control unit 54 of the display terminal 50 instructs the display 511 to display the screen-display image 400 related to the screen-display image data received by the transmitting-receiving unit 51 (step S36).

As described above, the display control system 1 can adjust the display style of the additional information 450 after generating the screen-display image data including the additional information 450 based on the recognition level of the additional information 450 set for the generated screen-display image data, with which the display control system 1 can provide a more suitable display screen for the observing person who views a plurality of objects, which may become the observation-target objects. Further, the adjustment processing of display style in step S34 of FIG. 15 may be a performed by the display terminal 50.

Figure 16:
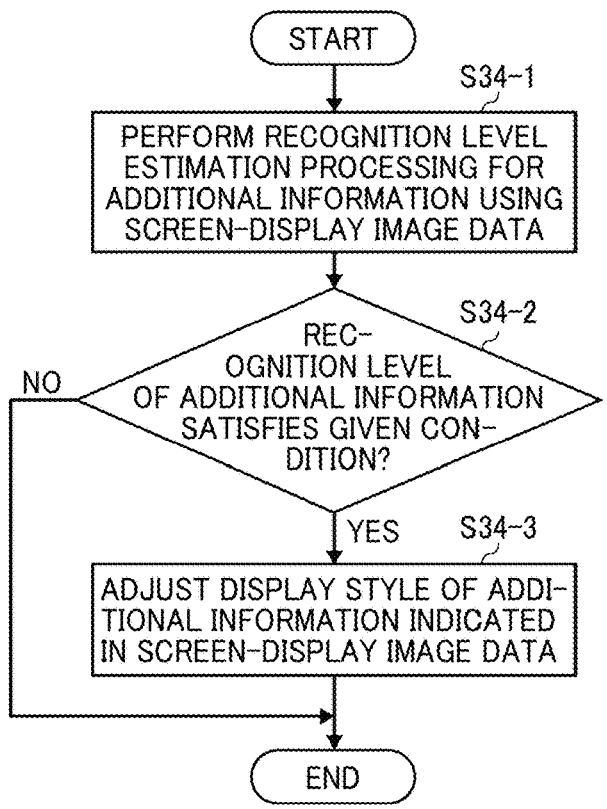
FIG. 16 is an example of flowchart of adjustment processing of display style according to an embodiment of this disclosure.

FIGS. 15 and 16 describe an example of performing the adjustment processing of display style using the screen-display image data set with the additional information, but is not limited thereto.

For example, the adjustment processing of display style may be performed using the captured image data before adding the additional information. In this case, before generating the screen-display image data, the screen-display image generation unit 33 of the display terminal 50 adjusts the display style of additional information to be applied to the screen-display image based on the recognition level of the observation-target object estimated in step S12-2. Then, the screen-display image generation unit 33 adjusts the display style of additional information to be set for the captured image data by changing or adjusting any one of indexes (e.g., luminance, complementary color, saturation, size, shape, output timing) of the additional information, or a combination thereof. Then, the screen-display image generation unit 33 generates the screen-display image data set with the additional information having the adjusted display style for the acquired captured image data (step S13 or step S33).

Modification Example 1

Figure 17:
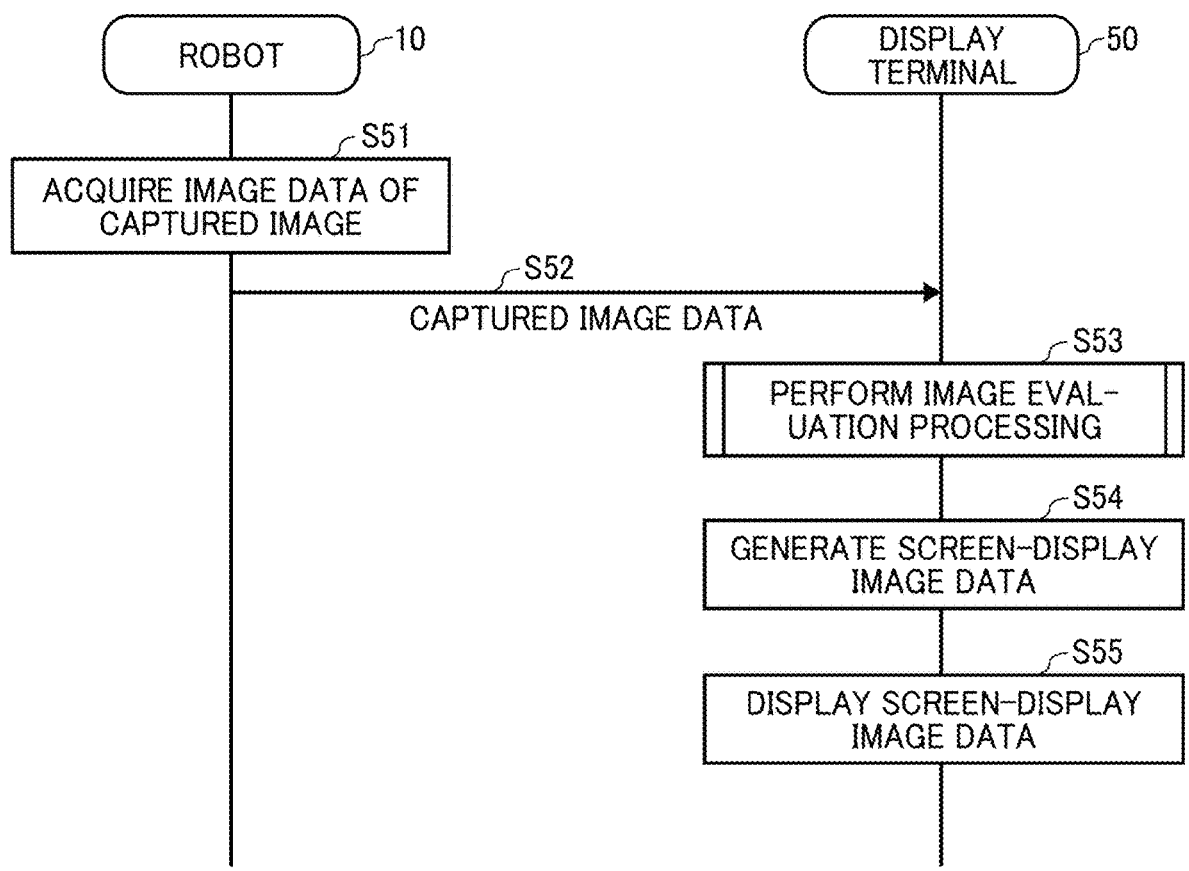
FIG. 17 is an example of sequence diagram of display processing of site image in a display control system of modification example 1 according to an embodiment of this disclosure.

Hereinafter, with reference to FIG. 17, a description is given of configuration of the display control system 1 according to modification example 1 of the embodiment. The display control system 1 according to the modification example 1 is a system that the display terminal 50 performs the image evaluation processing illustrated in FIG. 9. FIG. 17 is an example of sequence diagram of display processing of site image in the display control system 1 according to the modification example 1 of the embodiment.

At first, the image processing unit 36 of the robot 10 acquires an image (e.g., site image) captured by the image capture device 12 as the captured image (step S51) as similar to step S11 of FIG. 8.

Then, the transmitting-receiving unit 31 transmits the captured image data related to the captured image acquired in step S51 to the display terminal 50 (step S52). Then, the transmitting-receiving unit 51 of the display terminal 50 receives the captured image data transmitted from the robot 10.

Then, the evaluation unit 56 of the display terminal 50 performs the image evaluation processing for generating an image to be presented to an observing person using the captured image data received in step S52 (step S53). Since the image evaluation processing performed by the evaluation unit 56 is similar to the image evaluation processing performed by the evaluation unit 37 of the robot 10 (see FIG. 10), the description thereof will be omitted.

Then, the screen-display image generation unit 53 of the display terminal 50 generates screen-display image data related to a screen-display image to be presented to the observing person based on the captured image data received in step S51 and the evaluation data, which is the evaluation result obtained or acquired in step S53 (step S54).

Then, the display control unit 54 of the display terminal 50 instructs the display 511 to display the screen-display image 400 related to the screen-display image data generated in step S54 (step S55).

As described above, as to the display control system 1 according to the modification example 1 of the embodiment, even if the image evaluation processing is performed using the display terminal 50, the display control system 1 can provide a suitable display screen for the observing person who views a plurality of objects, which may become the observation-target objects. Further, the adjustment processing of display style illustrated in FIG. 16 can be also performed by the display terminal 50.

Modification Example 2

Hereinafter, with reference to FIG. 18, a description is given of configuration of the display control system 1 according to modification example 2 of the embodiment. The display control system 1 according to the modification example 2 of the embodiment is a system that the information processing server 70 performs the image evaluation processing illustrated in FIG. 9. FIG. 18 is an example of sequence diagram of the display processing of site image in the display control system 1 according to the modification example 2 of the embodiment.

At first, the image processing unit 36 of the robot 10 acquires an image (e.g., site image) captured by the image capture device 12 as the captured image (step S71) as similar to step S11 of FIG. 8.

Then, the transmitting-receiving unit 31 transmits the captured image data related to the captured image acquired in step S71 to the information processing server 70 (step S72). Then, the transmitting-receiving unit 71 of the information processing server 70 receives the captured image data transmitted from the robot 10.

Then, the evaluation unit 73 of the information processing server 70 performs the image evaluation processing for generating an image to be presented to an observing person using the captured image data received in step S72 (step S73). Since the image evaluation processing performed by the evaluation unit 73 is similar to the image evaluation processing performed by the evaluation unit 37 of the robot 10 (see FIG. 10), the description thereof will be omitted.

Then, the screen-display image generation unit 72 of the information processing server 70 generates screen-display image data related to a screen-display image to be presented to the observing person based on the captured image data received in step S71 and the evaluation data, which is the evaluation result obtained or acquired in step S73 (step S74).

Then, the transmitting-receiving unit 71 of the information processing server 70 transmits the screen-display image data generated in step S74 to the display terminal 50 (step S75). Then, the transmitting-receiving unit 51 of the display terminal 50 receives the screen-display image data transmitted from the information processing server 70.

Then, the display control unit 54 of the display terminal 50 instructs the display 511 to display the screen-display image 400 related to the screen-display image data received in step S75 (step S76).

As described above, as to the display control system 1 according to the modification example 2 of the embodiment, even if the image evaluation processing is performed using the information processing server 70, the display control system 1 can provide a suitable display screen for the observing person who views a plurality of objects, which may become the observation-target objects. Further, the adjustment processing of display style illustrated in FIG. 16 can be also performed by the information processing server 70.

Further, as to the processing in step S75, the transmitting-receiving unit 71 of the information processing server 70 may be configured to transmit the screen-display image data to the robot 10 to display the screen-display image 400 on the display 14 of the robot 10.

As to the above-described embodiment and modification examples, the processing using images captured by the robot 10 is described, in which the robot 10 is an example of movable apparatus, and the movable apparatus can be any vehicle, such as automobile, train, aircraft (e.g., unmanned aerial vehicle (UAV)), or watercraft (e.g., ship). Further, the robot 10 can be, for example a telepresence robot having a telepresence function, and an industrial robot. Further, the apparatus that acquires the captured image may not be limited to the movable apparatus such as the robot 10, but any apparatus equipped with a given image capture unit or means and not having a movement unit or means can be used.

As to the above described embodiment and modification examples, the output control apparatus (e.g., control apparatus 30, display terminal 50, information processing server 70) acquires image data of image that captures things or objects including a plurality of target objects, which may become the observation-target objects (e.g., captured image data related to the captured image 200), detects the plurality of target objects included in the acquired captured image data, and estimates the recognition level of the observing person on the detected plurality of target objects.

Then, based on the estimated recognition level, the output control apparatus identifies the target object having the lower recognition level, and outputs the screen-display image set with the additional information 450 related to the target object having the lower recognition level for the acquired captured image data (e.g., screen-display image data related to the screen-display image 400).

With this configuration, the output control apparatus can provide a suitable display screen for the observing person who views the plurality of target objects, which may become the observation-target objects, by preventing the distraction of the recognition level of the observing person caused by too many displayed information.

Further, as to the above described embodiment and modification examples, the output control apparatus (e.g., control apparatus 30, display terminal 50, information processing server 70) estimates the recognition level of the detected plurality of target objects based on at least any one of information of luminance, complementary color, saturation of things (objects) and target objects, and depth information indicating depth of things (objects) and target objects included in the captured image data (e.g., captured image data related to the captured image 200).

With this configuration, the output control apparatus can estimate the recognition level of the observation-target object by quantifying the recognition level using the feature value of things (objects) or target objects included in the captured image data.

Further, as to the above described embodiment and modification examples, if the recognition level of a specific target object becomes a given value or less, the output control apparatus (e.g., control apparatus 30, display terminal 50, information processing server 70) identifies the specific target object as an object having lower recognition level.

Further, if a difference between the representative value of the recognition level of the specific target object (specific object) and the representative value of the recognition level of another target object (another object) becomes a given value or more, the output control apparatus (e.g., control apparatus 30, display terminal 50, information processing server 70) identifies the specific target object as an object having lower recognition level.

With this configuration, the output control apparatus can identify the object having the lower recognition level of the observing person among the objects included in the captured image, Further, as to the above described embodiment and modification examples of the output control apparatus (e.g., control apparatus 30, display terminal 50, information processing server 70), the output unit outputs the screen-display image data by superimposing the additional information 450 related to the identified target object for the captured image data (e.g., captured image data related to the captured image 200) to generate the screen-display image 400 related to the display image data to be displayed on the display unit (e.g., display 14, display 511).

With this configuration, the output control apparatus can provide a suitable display screen for the observing person who views a plurality of objects, which may become the observation-target objects, by preventing the distraction of the recognition level of the observing person caused by too many displayed information.

Further, as to the above described embodiment and modification examples, the output control apparatus (e.g., control apparatus 30, display terminal 50, information processing server 70) generates the screen-display image data set with the additional information 450 related to the identified target object (e.g., screen-display image data related to the screen-display image 400), and estimates the recognition level of the additional information 450 based on at least any one of any one of indexes (e.g., luminance, complementary color, saturation, size, shape, output timing) of the additional information 450 set for the generated screen-display image data.

Then, if the estimated recognition level of the additional information 450 becomes a given value or more, the output control apparatus performs the adjustment processing to suppress the display style of the additional information 450, and outputs the screen-display image data set with the additional information 450 having adjusted the display style.

Further, if the estimated recognition level of the additional information 450 becomes a given value or less, or less than the given value, the output control apparatus performs the adjustment processing to increase or emphasize that the display style of the additional information 450, and outputs the screen-display image data set with the additional information 450 having adjusted the display style.

With this configuration, the output control apparatus can provide a more suitable display screen for the observing person who views a plurality of objects, which may become the observation-target objects.

Conventional methods display objects included in the captured image by emphasizing each one of the objects, the greater the number of emphasized objects, the greater the distraction for observing persons. Therefore, in conventional methods, a display screen suitable for viewing a plurality of objects for the observing persons cannot be provided.

According to the above described embodiment, a display screen suitable for viewing a plurality of objects for observing persons can be provided.

Further, each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Further, various tables used in the above described embodiment can be generated by the learning effect of machine learning, and the tables do not need to be used by classifying data of each item associated with other using the machine learning. The machine learning is a technology for acquiring learning ability like a person on a computer, and a technology which autonomously generates an algorithm required for determination, such as data identification, based on learning data acquired in advance, and predicting new data by applying the algorithm. The learning methods for machine learning may be either supervised learning, unsupervised learning, semi-supervised learning, reinforcement learning, deep learning, or any combination of these learning methods of for mechanical learning.

As to the output control apparatus, the display control system, the output control method, and the program described above, numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An output control apparatus comprising:
circuitry configured to acquire image data of a plurality of target objects captured at a site by an image capture device as captured image data;
detect the plurality of target objects included in the captured image data;
estimate a recognition level of an observing person on the detected plurality of target objects;
determine whether at least one target object, of the plurality of target objects, has a recognition level lower than the estimated recognition level of an observing person;
identify a specific target object having lower recognition level among the detected plurality of target objects based on the estimated recognition level, in response to determining that at least one target object has a recognition level lower than the estimated recognition level; and
output screen-display image data including additional information set for the identified specific target object having lower recognition level, the screen-display image data generated for the acquired captured image data.

2. The output control apparatus according to claim 1,
wherein the image capture device is configured to capture the captured image data by capturing images of the site, the captured image data including image data of the plurality of target objects, and
wherein the circuitry is configured to estimate the recognition level of the detected plurality of target objects based on any one of luminance, complementary color, saturation, or depth information indicating depth of the plurality of target objects.

3. The output control apparatus according to claim 1, wherein the circuitry is configured to:
identify the specific target object as a target object having lower recognition level in response to the recognition level of the specific target object becoming a given value or less.

4. The output control apparatus according to claim 1, wherein the circuitry is further configured to:
identify the specific target object as a target object having lower recognition level in response to a difference between the recognition level of the specific target object and the recognition level of another target object becoming a given value or more.

5. The output control apparatus according to claim 1, wherein the circuitry is further configured to:
generate the screen-display image data by superimposing the additional information set for the identified specific target object having lower recognition level on the captured image data; and
output the screen-display image data.

6. The output control apparatus according to claim 1, wherein the circuitry is further configured to:
output the screen-display image data to a display to display a screen-display image related to the screen-display image data on the display.

7. The output controller according to claim 1, wherein the circuitry is further configured to:
generate the screen-display image data; and
output the generated screen-display image data.

8. The output control apparatus according to claim 7, wherein the circuitry is further configured to:
estimate the recognition level of the additional information set in the generated screen-display image data;
adjust a display style of the additional information by changing an appearance of the addition information to reduce visual prominence of the additional information in response to the estimated recognition level of the additional information becoming a given value or more; and
output the screen-display image data set with the additional information having the adjusted display style.

9. The output control apparatus according to claim 8, wherein the circuitry is further configured to:
estimate the recognition level of the additional information based on any one of luminance, complementary color, saturation, size, shape, or output timing of the additional information.

10. The output control apparatus according to claim 7, wherein the circuitry is further configured to:
estimate the recognition level of the additional information set in the generated screen-display image data;
adjust a display style of the additional information by changing an appearance of the addition information to increase visual prominence of the additional information in response to the estimated recognition level of the additional information becoming a given value or less; and
output the screen-display image data set with the additional information having the adjusted display style.

11. The output control apparatus according to claim 7, wherein the circuitry is further configured to:
adjust a display style of the additional information based on the recognition level of the observing person on the plurality of target objects included in the captured image data; and
generate the screen-display image data set with the additional information having the adjusted display style.

12. The output control apparatus according to claim 1, wherein the output control apparatus is a movable apparatus configured to travel at the site, the movable apparatus including the image capture device configured to capture the captured image data including the image data of the plurality of target objects by capturing the images of the site, and
wherein the circuitry is further configured to acquire the capture image data including the image data of the plurality of target objects captured by the image capture device.

13. The output control apparatus according to claim 12, wherein the movable apparatus is any one of a robot, a vehicle, or an aircraft that travels at the site.

14. The output control apparatus according to claim 1, wherein the circuitry is further configured to:
estimate the recognition level based on a traveling direction of the output control apparatus.

15. The output control apparatus according to claim 1, wherein the circuitry is further configured to:
detect the plurality of target objects using a semantic segmentation method.

16. The output control apparatus according to claim 1, wherein the circuitry is further configured to:
estimate the recognition level of an observing person based on a maximum value of a recognition level of a region in the captured image data.

17. The output control apparatus according to claim 1, wherein the circuitry is further configured to:
estimate a recognition level of an observing person based on an average value of recognition levels of a region in the captured image data.

18. A display control system comprising:
a control apparatus including an image capture device configured to capture images of a plurality of target objects by capturing images of a site;
a display terminal configured to communicate with the control apparatus; and
circuitry configured to
acquire image data of the plurality of target objects captured by the image capture device as captured image data;
detect the plurality of target objects included in the captured image data;
estimate a recognition level of an observing person on the detected plurality of target objects;
determine whether at least one target object, of the plurality of target objects, has a recognition level lower than the estimated recognition level of an observing person;
identify a specific target object having lower recognition level among the detected plurality of target objects based on the estimated recognition level, in response to determining that at least one target object has a recognition level lower than the estimated recognition level; and output, to the display terminal, screen-display image data including additional information set for the identified specific target object having lower recognition level, generated for the acquired captured image data, the screen-display image data is displayed as a screen-display image at the display terminal.

19. The display control system of claim 18, further comprising:
a server configured to communicate with the control apparatus and the display terminal, the server including another circuitry configured to
receive, from the control apparatus, the captured image data obtained by capturing the image data of the plurality of target objects by the image capture device;
detect the plurality of target objects included in the captured image data;
estimate the recognition level of the observing person on the detected plurality of target objects;
identify the specific target object having lower recognition level among the detected plurality of target objects based on the estimated recognition level; and
transmit, to the display terminal, screen-display image data including additional information set for the identified specific target object having lower recognition level, the screen-display image data generated for the acquired captured image data.

20. A method of controlling of an output control apparatus, comprising:
acquiring image data of a plurality of target objects at a site captured by an image capture device as captured image data;
detecting the plurality of target objects included in the captured image data;
estimating a recognition level of an observing person on the detected plurality of target objects;
determining whether at least one target object, of the plurality of target objects, has a recognition level lower than the estimated recognition level of an observing person;
identifying a specific target object having lower recognition level among the detected plurality of target objects based on the estimated recognition level, in response to determining that at least one target object has a recognition level lower than the estimated recognition level; and
outputting screen-display image data including additional information set for the identified specific target object having lower recognition level, the screen-display image data generated for the acquired captured image data.

* * * * *